(12) United States Patent
Obana

(10) Patent No.: US 7,103,775 B2
(45) Date of Patent: Sep. 5, 2006

(54) SIGNATURE CALCULATION SYSTEM BY USE OF MOBILE AGENT

(75) Inventor: Satoshi Obana, Tokyo (JP)

(73) Assignee: NEC Corporation, Tokyo (JP)

( * ) Notice: Subject to any disclaimer, the term of this patent is extended or adjusted under 35 U.S.C. 154(b) by 804 days.

(21) Appl. No.: 09/760,805

(22) Filed: Jan. 17, 2001

(65) Prior Publication Data
US 2001/0016911 A1     Aug. 23, 2001

(30) Foreign Application Priority Data
Jan. 18, 2000 (JP) ............................. 2000-009037

(51) Int. Cl.
*H04L 9/00* (2006.01)
*H04K 1/00* (2006.01)

(52) U.S. Cl. ............... 713/180; 713/175; 713/182; 713/194; 713/170; 380/286; 380/30; 380/28; 380/380; 380/23; 726/2; 726/26

(58) Field of Classification Search ............. 713/180, 713/175; 380/286
See application file for complete search history.

(56) References Cited

U.S. PATENT DOCUMENTS 5,825,880 A * 10/1998 Sudia et al. ............. 713/180
5,867,578 A * 2/1999 Brickell et al. .......... 713/180
6,055,562 A * 4/2000 Devarakonda et al. ... 709/202

FOREIGN PATENT DOCUMENTS

JP 10-269186 10/1998
JP 11-506222 6/1999

OTHER PUBLICATIONS

"Handbook of Applied Cryptography," Chapter 8, pp. 294-298, Chapter 11, pp. 433-438 and Chapter 12, pp. 525-526, CRC Press, ISBN 0-8493-8523-7 (1997).

* cited by examiner

*Primary Examiner*—Syed A. Zia
(74) *Attorney, Agent, or Firm*—Foley & Lardner LLP

(57) ABSTRACT

A signature calculation system includes: a mobile agent for calculating a digital signature of the owner of the mobile agent; a base host of the mobile agent from which the mobile agent starts moving in a network; and remote hosts in the network which can be visited by the mobile agent. In the base host in which the mobile agent is activated, a secret key #0 of the owner of the mobile agent is partitioned and distributed into cipher texts (partial signature auxiliary data) that can be restored only when calculations by use of secret keys of k remote hosts are executed, and data including the cipher texts are stored in the mobile agent. A remote host visited by the mobile agent arbitrarily presents signature target data. If the mobile agent determined to write a digital signature for the signature target data, the mobile agent stores the signature target data and moves to the next remote host. Thereafter, each remote host visited by the mobile agent calculates a partial signature by use of the data stored in the mobile agent and a secret key of the remote host. After the mobile agent visited k remote hosts since the presentation of the signature target data, the mobile agent returns to the remote host that presented the signature target data, at which the digital signature for the signature target data by use of the secret key of the owner of the mobile agent is obtained from the partial signatures calculated by the k remote hosts.

20 Claims, 8 Drawing Sheets

F I G. 2
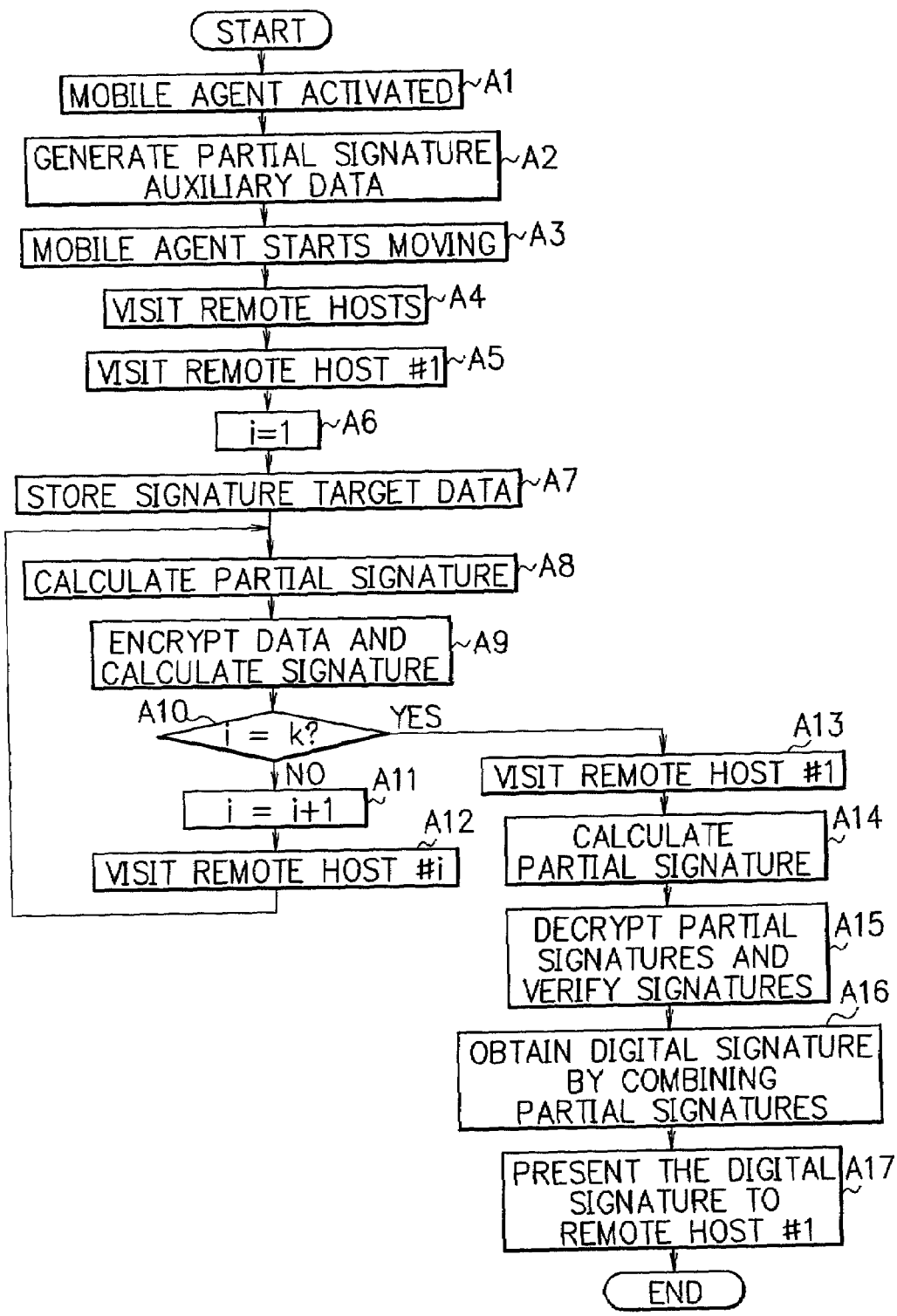

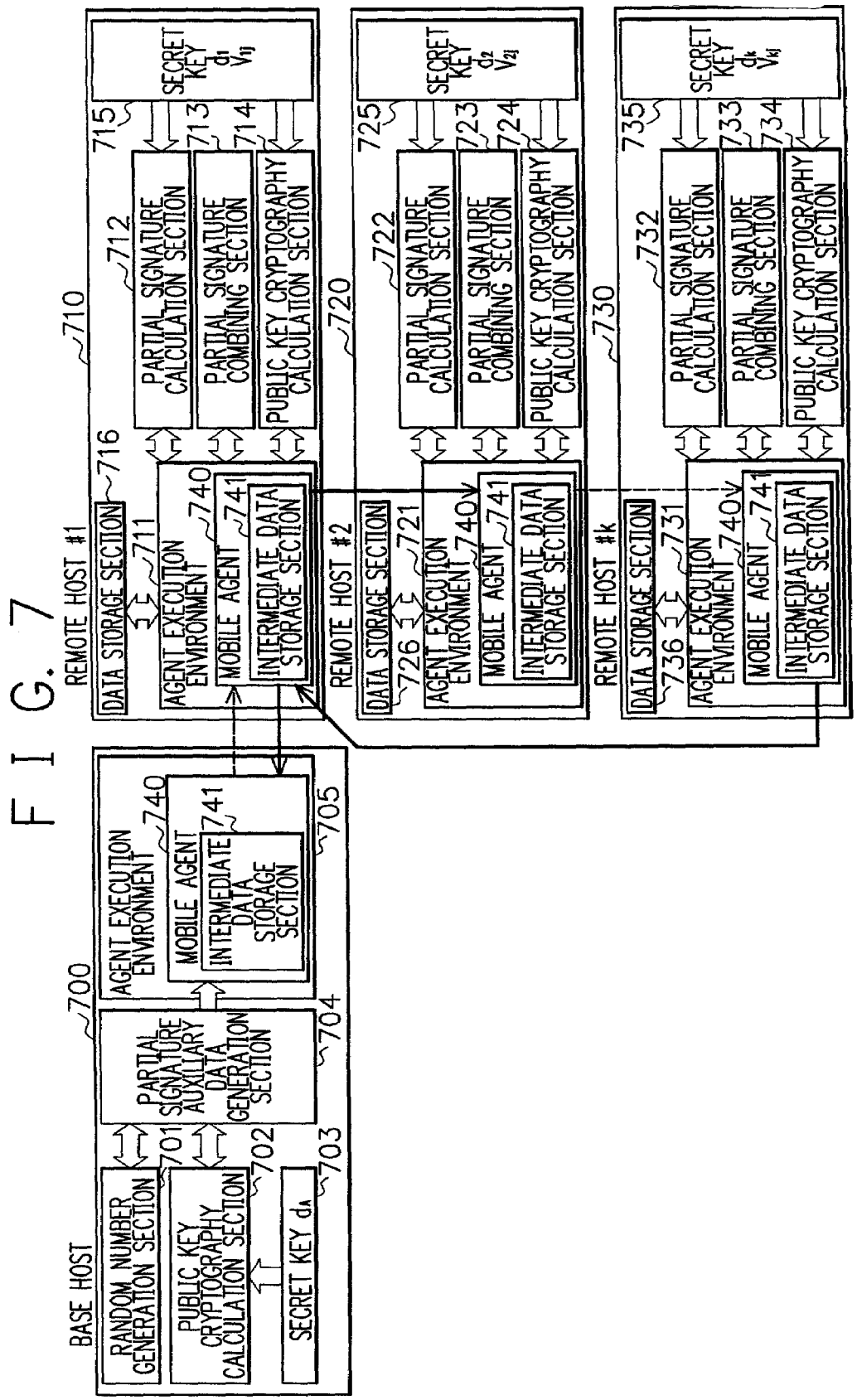
F I G. 7

SIGNATURE CALCULATION SYSTEM BY USE OF MOBILE AGENT

BACKGROUND OF THE INVENTION

The present invention relates to a signature calculation system by use of a mobile agent which is suitable for cases where the mobile agent which started from a base host calculates a digital signature at remote hosts, and computer-readable record mediums storing programs for a base host and remote hosts for implementing the signature calculation system.

DESCRIPTION OF THE RELATED ART

A mobile agent, such as program code (JAVA etc.) for checking the price of a product at a plurality of home pages and making a contract with a home page that offers the lowest price, moves among hosts (host computers) in a network autonomously and dynamically, and activates and executes its program code at remote hosts in order to achieve purposes of the owner of the mobile agent. For protecting the security of the mobile agent, program code for implementing algorithm of public key cryptography or secret key cryptography is included in the program code of the mobile agent so as to make data analysis by a malicious third party difficult, or digital signature data, which has been obtained by executing a calculation for the mobile agent program code by use of a secret key of the owner of the mobile agent, is added to the mobile agent in order to disable the alteration of the mobile agent program code or data included in the mobile agent.

Techniques for the security protection of the mobile agents have been proposed and disclosed in detail in Japanese Patent Application Laid-Open No.HEI10-269186, International Publication No.WO96/39765, etc.

The technique disclosed in Japanese Patent Application Laid-Open No.HEI10-269186 can prevent data analysis and data alteration by malicious third parties, however, if a remote host is designed with malice, data contained in the mobile agent can easily be analyzed by the remote host. When the mobile agent calculates a digital signature of its owner at a remote host, the mobile agent which is visiting the remote host has to have a secret key of its owner. Therefore, the remote host can easily obtain the secret key of the owner of the mobile agent by analyzing the program code and data contained in the mobile agent.

Due to the above problem, it has been difficult to let the mobile agent at a remote host write a digital signature for signature target data that is arbitrarily presented by the remote host.

The technique disclosed in International Publication No.WO96/39765 has a problem in efficiency when the number of remote hosts (to which authority to calculate the digital signature is given) is large. The technique of the document will be described later in detail.

SUMMARY OF THE INVENTION

It is therefore the primary object of the present invention to provide a signature calculation system by use of a mobile agent, by which a secret key of the owner of the mobile agent is carried by the mobile agent in a form that can not be analyzed by a single remote host, and thereby a digital signature of the owner of the mobile agent can be calculated for signature target data which is arbitrarily presented by a remote host, and the calculated digital signature can be presented to the remote host while protecting the secret key from being known by remote hosts.

Another object of the present invention is to provide a signature calculation system by use of a mobile agent, by which information that can be generated by the owner of the mobile agent only is carried by the mobile agent in a form that can not be analyzed by a single remote host, and thereby a digital signature can be calculated for signature target data (which is arbitrarily presented by a remote host) by use of the aforementioned information as a secret key, and the calculated digital signature can be presented to the remote host.

Another object of the present invention is to provide computer-readable record mediums storing programs for a base host and remote hosts for implementing such signature calculation system.

In accordance with a first aspect of the present invention, there is provided a signature calculation system by use of a mobile agent, comprising: a mobile agent for calculating a digital signature of the owner of the mobile agent; a base host of the mobile agent from which the mobile agent starts moving in a network; and remote hosts in the network which can be visited by the mobile agent. The base host includes an agent execution environment, a random number generation means, a partial signature auxiliary data generation means and a public key cryptography calculation means. The agent execution environment lets the mobile agent execute its program code. The random number generation means generates random numbers. To the partial signature auxiliary data generation means, the random numbers generated by the random number generation means and a secret key of the owner of the mobile agent are inputted. The partial signature auxiliary data generation means generates partial signature auxiliary data for distributing the information of the secret key of the owner of the mobile agent to the remote hosts so that the partial signature auxiliary data will be used when partial signatures necessary for the calculation of the digital signature of the owner of the mobile agent are calculated by remote hosts. The public key cryptography calculation means conducts encryption and signature calculation for the partial signature auxiliary data generated by the partial signature auxiliary data generation means. Each remote host includes an agent execution environment, a partial signature calculation means, a partial signature combining means and a public key cryptography calculation means. The agent execution environment lets the mobile agent execute its program code. To the partial signature calculation means, signature target data, data which have been carried by the mobile agent, and a secret key of the remote host are inputted. The partial signature calculation means calculates a partial signature which is necessary for the calculation of the digital signature of the owner of the mobile agent. To the partial signature combining means, one or more partial signatures calculated by one or more remote hosts are inputted. The partial signature combining means outputs the digital signature calculated for the signature target data by use of the secret key of the owner of the mobile agent. The public key cryptography calculation means conducts encryption and signature calculation for the partial signature calculated by the partial signature calculation means. The mobile agent, which started from the base host carrying the partial signature auxiliary data and which is arbitrarily presented with the signature target data by a remote host, stores the signature target data if the mobile agent determined to write the digital signature for the signature target data by use of the secret key of the owner of the mobile agent, and thereafter visits k (k: security parameter) remote hosts and carries the partial signatures calculated by the remote hosts to the remote host that presented the signature target data. At the remote host that presented the signature target data, the digital signature for the signature target data by use of the secret key of the owner of the mobile agent is obtained from the partial signatures calculated by the k remote hosts.

In accordance with a second aspect of the present invention, in the first aspect, one or more components of the remote host selected from the partial signature calculation means, the partial signature combining means and the public key cryptography calculation means are implemented by program code of the mobile agent.

In accordance with a third aspect of the present invention, in the first aspect, the partial signature auxiliary data generated by the partial signature auxiliary data generation means include cipher texts $(G_i, M_i)$ $(1 \leq i < k)$ which are obtained by encrypting random numbers $r_i$ $(1 \leq i < k)$ that satisfy a predetermined relationship with the secret key of owner of the mobile agent by use of ElGamal cryptosystem public keys $y_i$ $(1 \leq i < k)$.

In accordance with a fourth aspect of the present invention, in the third aspect, signatures calculated for the random numbers $r_i$ $(1 \leq i < k)$ by use of the secret key of the owner of the mobile agent are added to the partial signature auxiliary data carried by the mobile agent.

In accordance with a fifth aspect of the present invention, in the first aspect, the digital signature calculated for the signature target data is an RSA digital signature.

In accordance with a sixth aspect of the present invention, in the fifth aspect, the partial signature combining means of the remote host that presented the signature target data calculates the digital signature for the signature target data by obtaining the product (mod p×q (p, q: prime number of approximately 512 bits)) of the partial signatures calculated by the k remote hosts.

In accordance with a seventh aspect of the present invention, there is provided a signature calculation system by use of a mobile agent, comprising: a mobile agent for calculating a digital signature of the owner of the mobile agent; a base host of the mobile agent from which the mobile agent starts moving in a network; and remote hosts in the network which can be visited by the mobile agent. The base host includes an agent execution environment, a random number generation means, a partial signature auxiliary data generation means and a public key cryptography calculation means. The agent execution environment lets the mobile agent execute its program code. The random number generation means generates random numbers. To the partial signature auxiliary data generation means, the random numbers generated by the random number generation means are inputted. The partial signature auxiliary data generation means generates a new secret key and a new public key corresponding to the newly generated secret key, and generates partial signature auxiliary data for distributing the information of the newly generated secret key to the remote hosts so that the partial signature auxiliary data will be used when partial signatures necessary for the calculation of the digital signature of the owner of the mobile agent are calculated by remote hosts. The public key cryptography calculation means conducts encryption and signature calculation for the partial signature auxiliary data generated by the partial signature auxiliary data generation means. Each remote host includes an agent execution environment, a partial signature calculation means, a partial signature combining means and a public key cryptography calculation means. The agent execution environment lets the mobile agent execute its program code. To the partial signature calculation means, signature target data, data which have been carried by the mobile agent, and a secret key of the remote host are inputted. The partial signature calculation means calculates a partial signature which is necessary for the calculation of the digital signature of the owner of the mobile agent. To the partial signature combining means, one or more partial signatures calculated by one or more remote hosts are inputted. The partial signature combining means outputs the digital signature calculated for the signature target data by use of the newly generated secret key. The public key cryptography calculation means conducts encryption and signature calculation for the partial signature calculated by the partial signature calculation means. The mobile agent, which started from the base host carrying the partial signature auxiliary data and which is arbitrarily presented with the signature target data by a remote host, stores the signature target data if the mobile agent determined to write the digital signature for the signature target data by use of the newly generated secret key, and thereafter visits k (k: security parameter) remote hosts and carries the partial signatures calculated by the remote hosts to the remote host that presented the signature target data. At the remote host that presented the signature target data, the digital signature for the signature target data by use of the newly generated secret key is obtained from the partial signatures calculated by the k remote hosts.

In accordance with an eighth aspect of the present invention, in the seventh aspect, one or more components of the remote host selected from the partial signature calculation means, the partial signature combining means and the public key cryptography calculation means are implemented by program code of the mobile agent.

In accordance with a ninth aspect of the present invention, in the seventh aspect, the partial signature auxiliary data generated by the partial signature auxiliary data generation means include cipher texts $(G_i, M_i)$ $(1 \leq i < k)$ which are obtained by encrypting random numbers $r_i$ $(1 \leq i < k)$ that satisfy a predetermined relationship with the newly generated secret key by use of ElGamal cryptosystem public keys $y_i$ $(1 \leq i < k)$.

In accordance with a tenth aspect of the present invention, in the ninth aspect, signatures calculated for the random numbers $r_i$ $(1 \leq i < k)$ by use of a secret key of the owner of the mobile agent, a signature calculated for the newly generated public key by use of the secret key of the owner of the mobile agent, and the newly generated public key are added to the partial signature auxiliary data carried by the mobile agent.

In accordance with an eleventh aspect of the present invention, in the seventh aspect, the digital signature calculated for the signature target data is an RSA digital signature.

In accordance with a twelfth aspect of the present invention, in the eleventh aspect, the partial signature combining means of the remote host that presented the signature target data calculates the digital signature for the signature target data by obtaining the product (mod p×q (p, q: prime number of approximately 512 bits)) of the partial signatures calculated by the k remote hosts.

In accordance with a thirteenth aspect of the present invention, there is provided a computer-readable record medium storing a program for instructing a computer of a base host of a mobile agent to execute: an agent execution process for letting the mobile agent execute its program code; a random number generation process for generating random numbers; a partial signature auxiliary data generation process for receiving the random numbers generated in the random number generation process and a secret key of the owner of the mobile agent as input data and generating partial signature auxiliary data for distributing the information of the secret key of the owner of the mobile agent to remote hosts so that the partial signature auxiliary data will be used when partial signatures necessary for the calculation of a digital signature of the owner of the mobile agent are calculated by remote hosts; and a public key cryptography calculation process for conducting encryption and signature calculation for the partial signature auxiliary data generated in the partial signature auxiliary data generation process.

In accordance with a fourteenth aspect of the present invention, there is provided a computer-readable record medium storing a program for instructing a computer of a remote host to execute: an agent execution process for letting a mobile agent execute its program code; a partial signature calculation process for receiving signature target data which has been arbitrarily presented to the mobile agent by a remote host, data which have been carried by the mobile agent, and a secret key of the remote host as input data, and calculating a partial signature which is necessary for the calculation of a digital signature of the owner of the mobile agent for the signature target data; a partial signature combining process for receiving one or more partial signatures calculated by one or more remote hosts as input data and outputting the digital signature calculated for the signature target data by use of a secret key of the owner of the mobile agent; and a public key cryptography calculation process for conducting encryption and signature calculation for the partial signature calculated in the partial signature calculation process.

In accordance with a fifteenth aspect of the present invention, in the fourteenth aspect, the digital signature calculated for the signature target data in the partial signature combining process is an RSA digital signature.

In accordance with a sixteenth aspect of the present invention, in the fifteenth aspect, the digital signature for the signature target data is calculated in the partial signature combining process by obtaining the product (mod p×q (p, q: prime number of approximately 512 bits)) of the partial signatures calculated by the one or more remote hosts.

In accordance with a seventeenth aspect of the present invention, there is provided a computer-readable record medium storing a program for instructing a computer of a base host of a mobile agent to execute: an agent execution process for letting the mobile agent execute its program code; a random number generation process for generating random numbers; a partial signature auxiliary data generation process for receiving the random numbers generated in the random number generation process as input data, generating a new secret key and a new public key corresponding to the newly generated secret key, and generating partial signature auxiliary data for distributing the information of the newly generated secret key to remote hosts so that the partial signature auxiliary data will be used when partial signatures necessary for the calculation of a digital signature of the owner of the mobile agent are calculated by remote hosts; and a public key cryptography calculation process for conducting encryption and signature calculation for the partial signature auxiliary data generated in the partial signature auxiliary data generation process.

In accordance with an eighteenth aspect of the present invention, there is provided a computer-readable record medium storing a program for instructing a computer of a remote host to execute: an agent execution process for letting a mobile agent execute its program code; a partial signature calculation process for receiving signature target data which has been arbitrarily presented to the mobile agent by a remote host, data which have been carried by the mobile agent, and a secret key of the remote host as input data, and calculating a partial signature which is necessary for the calculation of a digital signature of the owner of the mobile agent for the signature target data; a partial signature combining process for receiving one or more partial signatures calculated by one or more remote hosts as input data and outputting the digital signature calculated for the signature target data by use of the newly generated secret key; and a public key cryptography calculation process for conducting encryption and signature calculation for the partial signature calculated in the partial signature calculation process.

In accordance with a nineteenth aspect of the present invention, in the eighteenth aspect, the digital signature calculated for the signature target data in the partial signature combining process is an RSA digital signature.

In accordance with a twentieth aspect of the present invention, in the nineteenth aspect, the digital signature for the signature target data is calculated in the partial signature combining process by obtaining the product (mod p×q (p, q: prime number of approximately 512 bits)) of the partial signatures calculated by the one or more remote hosts.

BRIEF DESCRIPTION OF THE DRAWINGS

The objects and features of the present invention will become more apparent from the consideration of the following detailed description taken in conjunction with the accompanying drawings, in which:

FIG. 2 is a flow chart for explaining the operation of the signature calculation system of FIG. 1;

FIG. 7 is a block diagram showing the composition of a signature calculation system as a second concrete example of the present invention.

DESCRIPTION OF THE PREFERRED EMBODIMENTS

Figure 1:
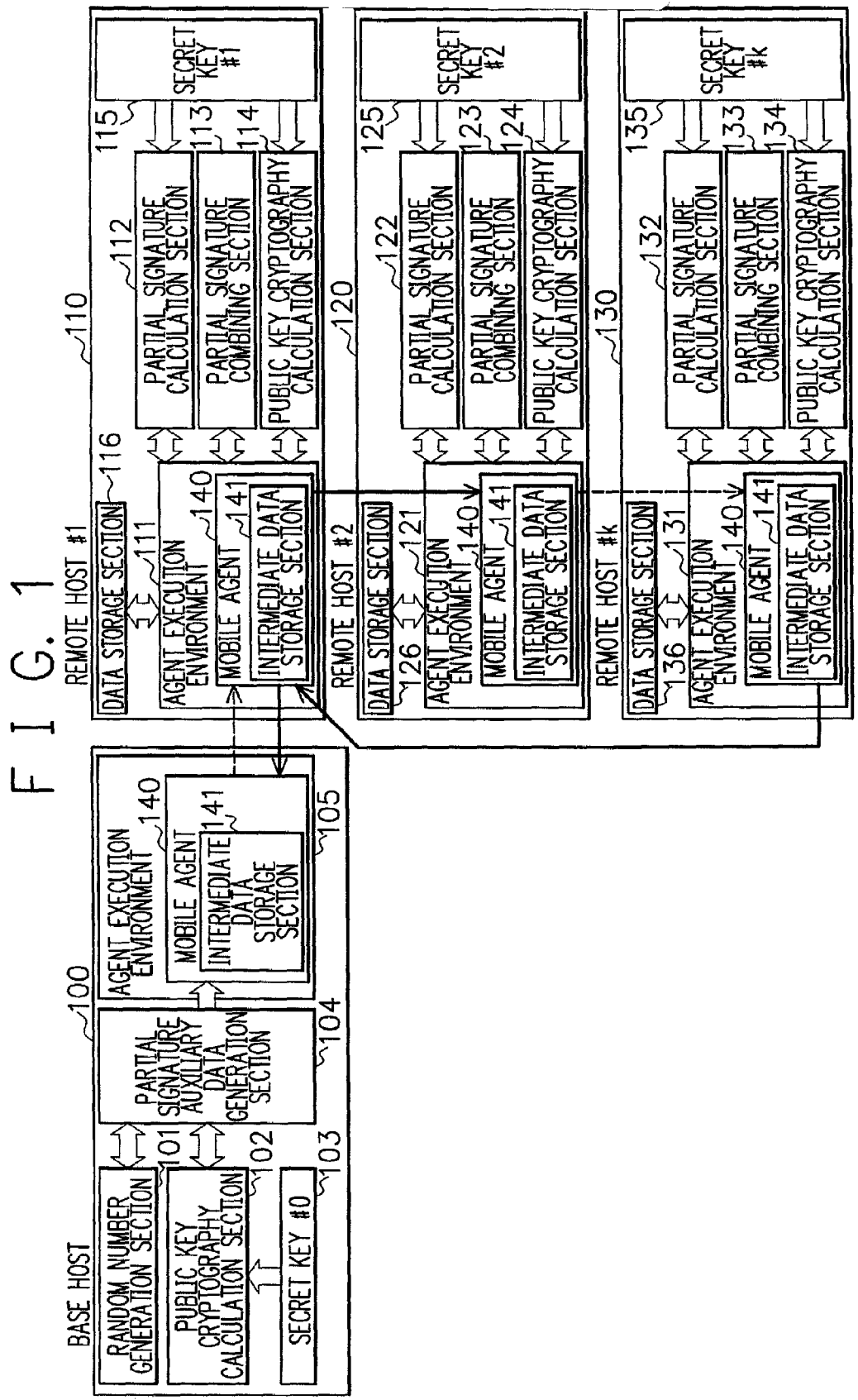
FIG. 1 is a block diagram showing the composition of a signature calculation system by use of a mobile agent in accordance with a first embodiment of the present invention.

Referring now to the drawings, a description will be given in detail of preferred embodiments in accordance with the present invention.

Embodiment 1

FIG. 1 is a block diagram showing the composition of a signature calculation system by use of a mobile agent in accordance with a first embodiment of the present invention.

The signature calculation system shown in FIG. 1 includes a base host 100, remote hosts #i ($1 \leq i \leq n$), and a mobile agent 140. The mobile agent 140 is implemented as, for example, program code (JAVA etc.) for checking the price of a product at a plurality of home pages and making a contract with a home page that offers the lowest price.

In FIG. 1, only three remote hosts 110, 120 and 130 (#1, #2 and #k) out of the n remote hosts #i ($1 \leq i \leq n$) are shown for the sake of simplicity. Solid arrows shown in FIG. 1 indicate the movement of the mobile agent 140. Broken arrows shown in FIG. 1 indicate the movement of the mobile agent 140 through two or more remote hosts.

The composition and the operation of the hosts (base host 100, remote hosts 110, 120, . . . ) and the mobile agent 140 will hereafter be explained briefly.

The base host 100 includes a random number generation section 101, a public key cryptography calculation section 102, a secret key #0 103 (of the owner of the mobile agent 140), a partial signature auxiliary data generation section 104, and an agent execution environment 105.

The random number generation section 101 generates and outputs random numbers according to requests of the partial signature auxiliary data generation section 104. The public key cryptography calculation section 102 receives data from the partial signature auxiliary data generation section 104 and executes encryption/decryption of the input data and calculation of digital signatures. In the case where a digital signature is calculated by the public key cryptography calculation section 102, the secret key #0 103 of the owner of the mobile agent 140 is also inputted to the public key cryptography calculation section 102.

The partial signature auxiliary data generation section 104 receives the random number supplied from the random number generation section 101 and the secret key #0 103 of the owner of the mobile agent 140, generates partial signature auxiliary data, and stores the generated partial signature auxiliary data in an intermediate data storage section 141 of the mobile agent 140 before starting from the base host 100. The partial signature auxiliary data are data to be used for calculating partial signatures at remote hosts #i ($1 \leq i \leq k$). The partial signatures calculated at the remote hosts #i ($1 \leq i \leq k$) will be used for calculating a digital signature of the owner of the mobile agent 140 (a digital signature by use of the secret key #0 103 of the owner of the mobile agent 140).

The agent execution environment 105 provides the mobile agent 140 with a calculation environment (CPU resources, memory, etc.) which is necessary for the execution of program code of the mobile agent 140.

The remote host #1 110 includes an agent execution environment 111, a partial signature calculation section 112, a partial signature combining section 113, a public key cryptography calculation section 114, a secret key #1 115, and a data storage section 116.

The agent execution environment 111 provides the mobile agent 140 with a calculation environment (CPU resources, memory, etc.) which is necessary for the execution of the program code, similarly to the agent execution environment 105 of the base host 100.

The partial signature calculation section 112 receives the partial signature auxiliary data (which has been generated by the partial signature auxiliary data generation section 104 of the base host 100 and stored in the intermediate data storage section 141 of the mobile agent 140), signature target data (which has been determined dynamically while the mobile agent 140 visited some remote hosts), and the secret key #1 115 of the remote host #1 110, and calculates a partial signature which will be used for the calculation of the digital signature by use of the secret key #0 103 of the owner of the mobile agent 140. The calculated partial signature is stored in the intermediate data storage section 141 of the mobile agent 140.

The partial signature combining section 113 receives the partial signatures (which have been calculated by the partial signature calculation sections (112, 122, 132) of one or more remote hosts #1 ($1 \leq i \leq k$) and stored in the intermediate data storage section 141 of the mobile agent 140), calculates the digital signature (by use of the secret key #0 103 of the owner of the mobile agent 140) for the signature target data by use of the partial signatures, and outputs the calculated digital signature.

The public key cryptography calculation section 114 encrypts the output data of the partial signature calculation section 112 by use of a public key of a remote host to which the digital signature should be presented (that is, a remote host that presented the signature target data) in order to conceal the output data from other hosts (hosts other than the remote host to which the digital signature should be presented). Further, in order to protect the output data of the partial signature calculation section 112 from being analyzed or tampered by other remote hosts, the public key cryptography calculation section 114 encrypts the output data by use of a public key of a host that receives the data, and calculates a digital signature for the output data by use of a secret key of the remote host to which the aforementioned digital signature (for the signature target data) should be presented. In the following explanation, it will be assumed that the remote host #1 110 presents the signature target data and the digital signature for the signature target data is presented to the remote host #1 110, therefore, the public key cryptography calculation section 114 will use the secret key #1 115 of the remote host #1 110 for the calculation of the digital signature for the output data of the partial signature calculation section 112.

The data storage section 116 temporarily stores necessary data that will be used later, until the mobile agent 140 returns to the remote host (#1 110).

Each of the other remote hosts #i ($2 \leq i \leq n$) has the same composition as the remote host #1 110, and thus repeated description thereof is omitted.

The mobile agent 140 is provided with the intermediate data storage section 141. The intermediate data storage section 141 stores intermediate data (which are necessary for the calculation of the digital signature for the signature target data) which are outputted by the partial signature auxiliary data generation section 104 of the base host 100 and the partial signature calculation sections (112, 122, . . . ) of the remote hosts #i ($1 \leq i \leq k$).

In this embodiment, the mobile agent 140 which started from the remote host #1 110 visits some remote hosts and thereafter visits the remote host #1 110. A signature target data is presented to the mobile agent 140 by the remote host #1 110, and a digital signature of the owner of the mobile agent 140 for the signature target data is generated by use of data (partial signatures) which are calculated and outputted by the remote hosts#i ($1 \leq i \leq k$).

In the following, the total operation of the signature calculation system of the first embodiment will be described in detail referring to FIG. 1 and FIG. 2. FIG. 2 is a flow chart for explaining the operation of the signature calculation system of FIG. 1.

First, the mobile agent 140 for calculating a digital signature at a remote host is activated in the agent execution environment 105 of the base host 100 (step A1).

Subsequently, the partial signature auxiliary data generation section 104, which is supplied with the secret key #0

103 of the owner of the mobile agent 140 and one or more random numbers outputted by the random number generation section 101, generates partial signature auxiliary data that satisfies a predetermined relationship with the secret key #0 103, and stores the generated partial signature auxiliary data in the intermediate data storage section 141 of the mobile agent 140. In order to protect the partial signature auxiliary data from being tampered by remote hosts which the mobile agent 140 will visit, a digital signature for the partial signature auxiliary data is generated by use of the secret key #0 103. The partial signature auxiliary data is stored in the intermediate data storage section 141 of the mobile agent 140 together with the digital signature (step A2).

After the storage of the partial signature auxiliary data and the digital signature in the intermediate data storage section 141 is completed, the mobile agent 140 starts moving in a network (step A3). The mobile agent 140 dynamically visits 0 or more remote hosts. At each remote host, various types of data are presented to the mobile agent 140. The mobile agent 140 judges whether or not each of the presented data is signature target data (target data to which a signature should be put) (step A4). In the flow chart of FIG. 2, it is assumed that the data presented to the mobile agent 140 in the step A4 are not signature target data to which the mobile agent 140 puts a signature.

After the mobile agent 140 dynamically visited 0 or more remote hosts, the mobile agent 140 visits a remote host #1 110 (step A5, step A6). At the remote host #1 110, the mobile agent 140 is presented with signature target data (for a contract etc.). Due to the presentation of the signature target data, the mobile agent 140 determines to calculate a digital signature by use of the secret key #0 103 of the owner of the mobile agent 140, and stores the signature target data in the intermediate data storage section 141 (step A7).

After the storage of the signature target data is completed, the remote host #1 110 inputs all or part of the data which have been stored in the intermediate data storage section 141 and the secret key #1 115 of the remote host #1 110 to the partial signature calculation section 112, and thereby calculates a partial signature. The partial signature will be used later when a digital signature for the signature target data by use of the secret key #0 103 of the owner of the mobile agent 140 is calculated by the remote host #1 110 (step A8).

Out of the data that have been stored in the intermediate data storage section 141 of the mobile agent 140 and that have been inputted to the partial signature calculation section 112, data that will not be referred to by any of subsequently visited remote hosts (that is, data for the remote host #1 110 only) are removed from the intermediate data storage section 141, and the unnecessary data are stored in the data storage section 116 as historical logs. Out of the output of the partial signature calculation section 112, data that will not be referred to by any of the subsequently visited remote hosts are also stored in the data storage section 116. For data that will be referred to by one or more of the subsequently visited remote hosts, a digital signature is calculated by the public key cryptography calculation section 114 by use of the secret key #1 115 of the remote host #1 110, and the data is stored in the intermediate data storage section 141 of the mobile agent 140 together with the digital signature (step A9).

After the above steps at the remote host #1 110 are finished, the mobile agent 140 visits the next remote host (step A10, step A11, step A12). The remote host to be visited by the mobile agent 140 next has been determined before the visit to the remote host #1 110, or is determined dynamically by the remote host #1 110 during the visit to the remote host #1 110. Hereafter, remote hosts which are visited by the mobile agent 140 after the visit to the remote host #1 110 will be referred to as "remote hosts #2, #3, #4 . . . " in order of visiting.

Steps conducted by each of the subsequently visited remote hosts #2, #3, #4 . . . are basically the same, and thus steps at a remote host #i ($2 \leq i \leq k$) will be explained.

The remote host #i (120, 130) inputs all or part of the data which have been stored in the intermediate data storage section 141 and the secret key #i of the remote host #i (120, 130) to the partial signature calculation section (122, 132), and thereby calculates a partial signature. The partial signature will be used later when the digital signature for the signature target data by use of the secret key #0 103 of the owner of the mobile agent 140 is calculated by the remote host #1 110. If signatures have been added to the data to be inputted to the partial signature calculation section (122, 132), the verification of the signatures are also executed (step A8).

Out of the data that have been stored in the intermediate data storage section 141 and that have been inputted to the partial signature calculation section (122, 132), data that will not be referred to by any of subsequently visited remote hosts #j (j=1, or $i+1 \leq j \leq k$) (that is, data for the remote host #i only) are inputted to the public key cryptography calculation section (124, 134), thereby the unnecessary data are encrypted by use of the public key of the owner of the mobile agent 140. The encrypted unnecessary data are stored in the intermediate data storage section 141 of the mobile agent 140 as history logs.

Out of the output of the partial signature calculation section (122, 132), data that will not be referred to by any of subsequently visited remote hosts #j ($i+1 \leq j \leq k$) are encrypted by the public key cryptography calculation section (124, 134) by use of the public key of the remote host #1 110, and the encrypted data are stored in the intermediate data storage section 141 of the mobile agent 140. Out of the output of the partial signature calculation section (122, 132), for data that will be referred to by one or more of the subsequently visited remote hosts #j ($i+1 \leq j \leq k$), a digital signature is calculated by the public key cryptography calculation section (124, 134) by use of the secret key #i (125, 135) of the remote host #i, and the data is stored in the intermediate data storage section 141 of the mobile agent 140 together with the digital signature (step A9).

After the above steps at the remote host #i are finished, the mobile agent 140 visits the next remote host. The remote host to be visited next by the mobile agent 140 is another remote host #i+1 if i≠k (that is, if the mobile agent 140 has not visited k remotes hosts yet). If i=k (that is, if the mobile agent 140 has already visited k remote hosts), the mobile agent 140 returns to the remote host #1 110 (step A10, step A11, step A12, step A13). The remote host to be visited by the mobile agent 140 next in the case where i≠k has been determined before the visit to the remote host #i, or is determined dynamically by the remote host #i during the visit to the remote host #i.

After the mobile agent 140 reached the remote host #1 110 again, the remote host #1 110 inputs all or part of the data which have been stored in the intermediate data storage section 141 and the secret key #1 115 of the remote host #1 110 to the partial signature calculation section 112, and thereby calculates a partial signature which will be used when the digital signature for the signature target data by use of the secret key #0 103 of the owner of the mobile agent 140 is calculated (step A14).

After the calculation of the partial signature is completed, if the data stored in the intermediate data storage section 141 have been encrypted, the remote host #1 110 inputs the encrypted data and the secret key #1 115 of the remote host #1 110 to the public key cryptography calculation section 114 and thereby decrypts the data. The remote host #1 110 verifies the signatures which have been added to the data by inputting the decrypted data and public keys of the remote hosts (that generated the signatures) to the public key cryptography calculation section 114. If the data stored in the intermediate data storage section 141 have not been encrypted, the remote host #1 110 verifies the signatures which have been added to the data by inputting the data and the public keys of the remote hosts (that generated the signatures) to the public key cryptography calculation section 114, and thereby ascertains that the data have not been tampered (step A15).

At the point when the verification of all the signatures added to the data is finished, the remote host #1 110 has obtained partial signatures which have been calculated by the visited remote hosts (1≦i≦k). The remote host #1 110 inputs all or part of the obtained partial signatures to the partial signature combining section 113, thereby the digital signature for the signature target data by use of the secret key #0 103 of the owner of the mobile agent 140 is obtained (step A16). Thereafter, the remote host #1 110 stores the obtained digital signature in the data storage section 116 (in other words, the digital signature for the signature target data is presented to the remote host #1 110), and the mobile agent 140 returns to the base host 100 (step A17).

According to the first embodiment which has been explained above, the following effects can be obtained. The digital signature obtained by the above process is a digital signature whose integrity can always be verified by use of the public key of the owner of the mobile agent 140, regardless of which hosts the mobile agent 140 visited and regardless of the order of visiting. As for the possibility of forgery of the digital signature, calculations by use of secret keys of k remote hosts are necessary for generating the digital signature of the owner of the mobile agent 140, therefore, the forgery of the digital signature can be prevented unless k remote hosts conspire together.

Embodiment 2

In the following, a second embodiment of the present invention will be explained in detail.

In the first embodiment, the digital signature which is calculated by the mobile agent 140 and presented to the remote host #1 110 (which presented the signature target data) was a digital signature for the signature target data by use of the secret key #0 103 of the owner of the mobile agent 140. In the second embodiment, three pieces of data: a digital signature calculated for the signature target data by use of a secret key which is newly generated by the base host of the mobile agent before the mobile agent starts moving; a newly generated public key corresponding to the newly generated secret key; and a digital signature which is calculated for the newly generated public key by use of the secret key of the owner of the mobile agent (by use of the secret key which has preliminarily been owned by the owner of the mobile agent), are presented to the remote host that presented the signature target data.

Figure 3:
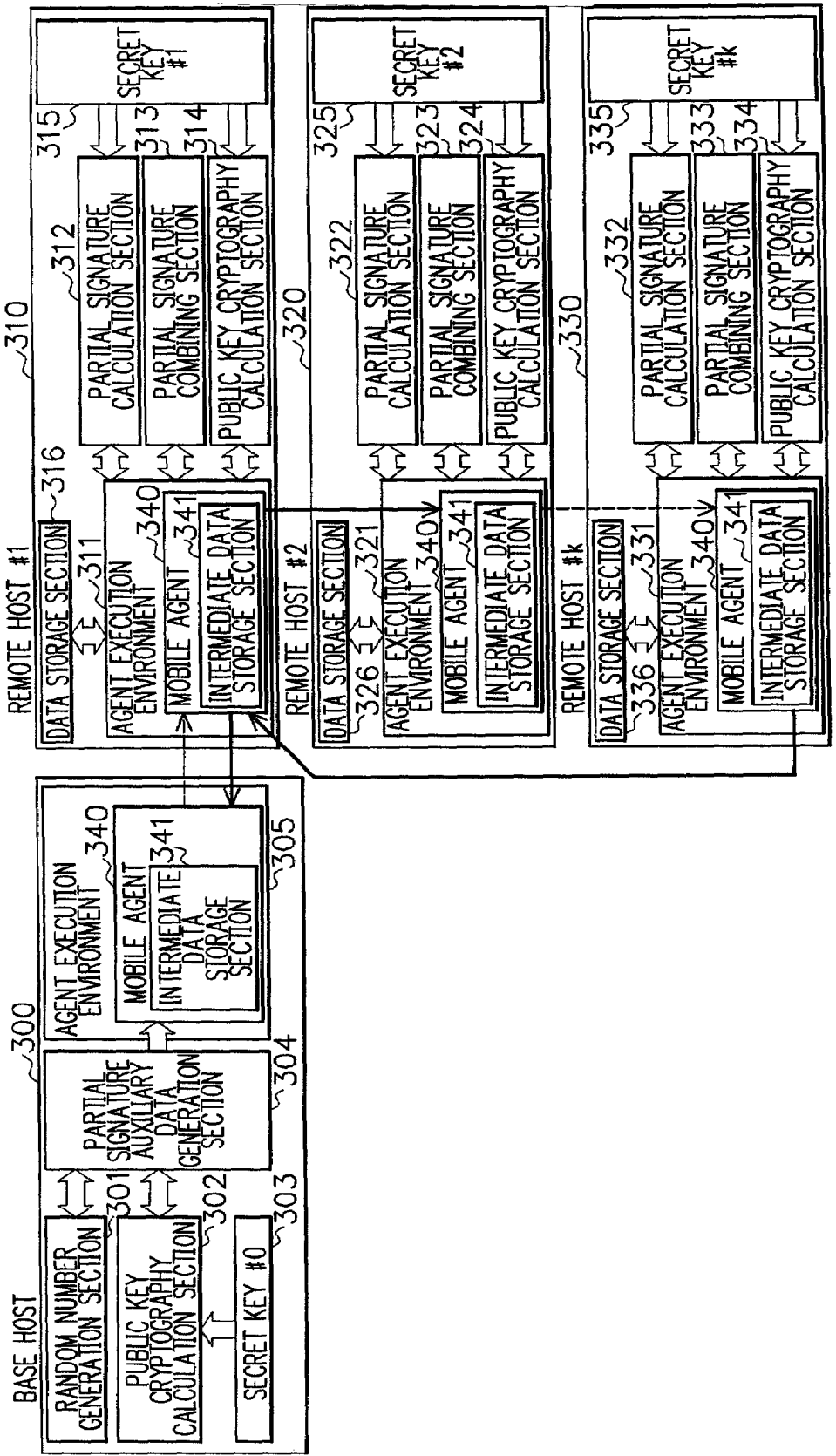
FIG. 3 is a block diagram showing the composition of a signature calculation system by use of a mobile agent in accordance with a second embodiment of the present invention.

FIG. 3 is a block diagram showing the composition of a signature calculation system by use of a mobile agent in accordance with the second embodiment of the present invention.

The signature calculation system shown in FIG. 3 includes a base host 300, remote hosts #i (1≦i≦n), and a mobile agent 340. In FIG. 3, only three remote hosts 310, 320 and 330 (#1, #2 and #k) out of the n remote hosts #i (1≦i≦n) are shown for the sake of simplicity. Solid arrows shown in FIG. 3 indicate the movement of the mobile agent 340. Broken arrows shown in FIG. 3 indicate the movement of the mobile agent 340 through two or more remote hosts.

The composition and the operation of the hosts (base host 300, remote hosts 310, 320, . . . ) and the mobile agent 340 will hereafter be explained briefly.

The base host 300 includes a random number generation section 301, a public key cryptography calculation section 302, a secret key #0 303 (of the owner of the mobile agent 340), a partial signature auxiliary data generation section 304, and an agent execution environment 305. The random number generation section 301, the public key cryptography calculation section 302, the secret key #0 303 and the agent execution environment 305 are the same as the random number generation section 101, the public key cryptography calculation section 102, the secret key #0 103 and the agent execution environment 105 of the first embodiment, and thus repeated description thereof is omitted.

The partial signature auxiliary data generation section 304 receives a random number outputted by the random number generation section 301, generates a new secret key and a new public key, generates partial signature auxiliary data, and stores the generated partial signature auxiliary data and a digital signature (generated for the partial signature auxiliary data by use of the secret key #0 303 of the owner of the mobile agent 340) in an intermediate data storage section 341 of the mobile agent 340 before starting from the base host 300. The partial signature auxiliary data are data to be used for calculating partial signatures at remote hosts #i (1≦i≦k). The partial signatures calculated at the remote hosts #i (1≦i≦k) will be used for calculating the digital signature for the signature target data by use of the newly generated secret key. The partial signature auxiliary data generation section 304 further stores the newly generated public key in the intermediate data storage section 341 of the mobile agent 340 before starting from the base host 300 together with the digital signature calculated for the newly generated public key by use of the secret key #0 303 of the owner of the mobile agent 340.

The remote host #1 310 includes an agent execution environment 311, a partial signature calculation section 312, a partial signature combining section 313, a public key cryptography calculation section 314, a secret key #1 315, and a data storage section 316. The agent execution environment 311, the partial signature calculation section 312, the public key cryptography calculation section 314, the secret key #1 315 and the data storage section 316 are the same as the agent execution environment 111, the partial signature calculation section 112, the public key cryptography calculation section 114, the secret key #1 115 and the data storage section 116 of the first embodiment, and thus repeated description thereof is omitted.

The partial signature combining section 313 receives data (which have been calculated by the partial signature calculation sections (312, 322, 332) of one or more remote hosts #1 (1≦i≦k) and stored in the intermediate data storage section 341 of the mobile agent 340) and outputs the digital signature of the owner of the mobile agent 340 for the signature target data. The digital signature of the owner of the mobile agent 340 for the signature target data includes the aforementioned three pieces of data: the digital signature calculated for the signature target data by use of the secret key which is newly generated by the partial signature auxiliary data generation section 304 of the base host 300; the newly generated public key which has been stored in the intermediate data storage section 341 of the mobile agent 340; and the digital signature calculated for the newly generated public key by use of the secret key #0 303 of the owner of the mobile agent.

Each of the other remote hosts #i (2≦i≦n) has the same composition as the remote host #1 310, and thus repeated description thereof is omitted.

The mobile agent 340 is provided with the intermediate data storage section 341 for storing intermediate data. The mobile agent 340 is basically the same as the mobile agent 140 of the first embodiment, and thus repeated description thereof is omitted.

In this embodiment, the mobile agent 340 which started from the remote host #1 310 visits some remote hosts and thereafter visits the remote host #1 310. The signature target data is presented to the mobile agent 340 by the remote host #1 310, and the digital signature of the owner of the mobile agent 340 for the signature target data is generated by use of data (partial signatures) which are calculated and outputted by the remote hosts #i (1≦i≦k).

Figure 4:
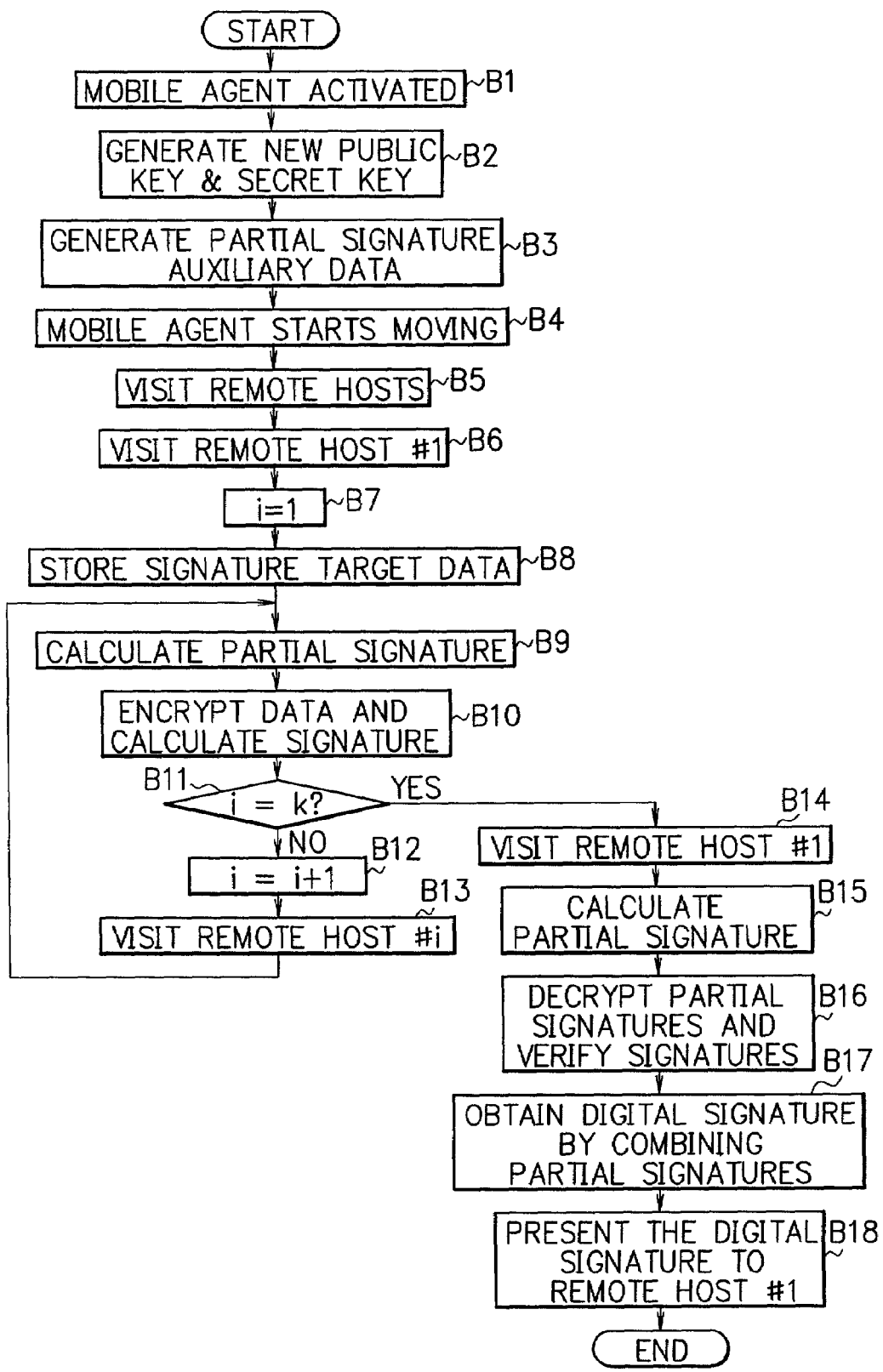
FIG. 4 is a flow chart for explaining the operation of the signature calculation system of FIG. 3.

In the following, the total operation of the signature calculation system of the second embodiment will be described in detail referring to FIG. 3 and FIG. 4. FIG. 4 is a flow chart for explaining the operation of the signature calculation system of FIG. 3.

First, the mobile agent 340 for calculating a digital signature at a remote host is activated in the agent execution environment 305 of the base host 300 (step B1).

Subsequently, the partial signature auxiliary data generation section 304, which is supplied with one or more random numbers outputted by the random number generation section 301, generates a new secret key and a new public key corresponding to the newly generated secret key. The partial signature auxiliary data generation section 304, which is also supplied with the secret key #0 303 of the owner of the mobile agent 340, calculates a digital signature for the newly generated public key by use of the secret key #0 303, and stores the newly generated public key and the digital signature for the newly generated public key in the intermediate data storage section 341 of the mobile agent 340 (step B2).

Subsequently, the partial signature auxiliary data generation section 304, which is supplied with one or more random numbers outputted by the random number generation section 301, generates partial signature auxiliary data that satisfies a predetermined relationship with the newly generated secret key of the step B2, and stores the partial signature auxiliary data in the intermediate data storage section 341 of the mobile agent 340. In order to protect the partial signature auxiliary data from being tampered by remote hosts which the mobile agent 340 will visit, a digital signature for the partial signature auxiliary data is generated by use of the secret key #0 303. The partial signature auxiliary data is stored in the intermediate data storage section 341 of the mobile agent 340 together with the digital signature (step B3).

After the storage of the partial signature auxiliary data and the digital signature in the intermediate data storage section 341 is completed, the mobile agent 340 starts moving in a network (step B4). The mobile agent 340 dynamically visits 0 or more remote hosts. At each remote host, various types of data are presented to the mobile agent 340. The mobile agent 340 judges whether or not each of the presented data is signature target data (target data to which a signature should be put) (step B5). In the flow chart of FIG. 4, it is assumed that the data presented to the mobile agent 340 in the step B5 are not signature target data to which the mobile agent 340 puts a signature.

After the mobile agent 340 dynamically visited 0 or more remote hosts, the mobile agent 340 visits a remote host #1 310 (step B6, step B7). At the remote host #1 310, the mobile agent 340 is presented with signature target data (for a contract etc.). Due to the presentation of the signature target data, the mobile agent 340 determines to calculate a digital signature by use of the newly generated secret key (which has been generated by the partial signature auxiliary data generation section 304 of the base host 300), and stores the signature target data in the intermediate data storage section 341 (step B8).

After the storage of the signature target data is completed, the remote host #1 310 inputs all or part of the data which have been stored in the intermediate data storage section 341 and the secret key #1 315 of the remote host #1 310 to the partial signature calculation section 312, and thereby calculates a partial signature. The partial signature will be used later when the digital signature for the signature target data by use of the newly generate secret key is calculated by the remote host #1 310 (step B9).

Out of the data that have been stored in the intermediate data storage section 341 of the mobile agent 340 and that have been inputted to the partial signature calculation section 312, data that will not be referred to by any of subsequently visited remote hosts (that is, data for the remote host #1 310 only) are removed from the intermediate data storage section 341, and the unnecessary data are stored in the data storage section 316 as historical logs. Out of the output of the partial signature calculation section 312, data that will not be referred to by any of the subsequently visited remote hosts are also stored in the data storage section 316. For data that will be referred to by one or more of the subsequently visited remote hosts, a digital signature is calculated by the public key cryptography calculation section 314 by use of the secret key #1 315 of the remote host #1 310, and the data is stored in the intermediate data storage section 341 of the mobile agent 340 together with the digital signature (step B10).

After the above steps at the remote host #1 310 are finished, the mobile agent 340 visits the next remote host (step B11, step B12, step B13). The remote host to be visited by the mobile agent 340 next has been determined before the visit to the remote host #1 310, or is determined dynamically by the remote host #1 310 during the visit to the remote host #1 310. Hereafter, remote hosts which are visited by the mobile agent 340 after the visit to the remote host #1 310 will be referred to as "remote hosts #2, #3, #4 . . . " in order of visiting.

Steps conducted by each of the subsequently visited remote hosts #2, #3, #4 . . . are basically the same, and thus steps at a remote host #i (2≦i≦k) will be explained.

The remote host #i (320, 330) inputs all or part of the data which have been stored in the intermediate data storage section 341 and the secret key #i of the remote host #i (320, 330) to the partial signature calculation section (322, 332), and thereby calculates a partial signature. The partial signature will be used later when the digital signature for the signature target data by use of the newly generated secret key is calculated by the remote host #1 310. If signatures have been added to the data to be inputted to the partial signature calculation section (322, 332), the verification of the signatures are also executed (step B9).

Out of the data that have been stored in the intermediate data storage section 341 and that have been inputted to the partial signature calculation section (322, 332), data that will not be referred to by any of subsequently visited remote hosts #j (j=1, or i+1≦j≦k) (that is, data for the remote host #i only) are inputted to the public key cryptography calculation section (324, 334), thereby the unnecessary data are encrypted by use of the public key of the owner of the mobile agent 340. The encrypted unnecessary data are stored in the intermediate data storage section 341 of the mobile agent 340 as history logs.

Out of the output of the partial signature calculation section (322, 332), data that will not be referred to by any of subsequently visited remote hosts #j (i+1≦j≦k) are encrypted by the public key cryptography calculation section (324, 334) by use of the public key of the remote host #1 310, and the encrypted data are stored in the intermediate data storage section 341 of the mobile agent 340.

Out of the output of the partial signature calculation section (322, 332), for data that will be referred to by one or more of the subsequently visited remote hosts #j (i+1≦j≦k), a digital signature is calculated by the public key cryptography calculation section (324, 334) by use of the secret key #i (325, 335) of the remote host #i, and the data is stored in the intermediate data storage section 341 of the mobile agent 340 together with the digital signature (step B10).

After the above steps at the remote host #i are finished, the mobile agent 340 visits the next remote host. The remote host to be visited next by the mobile agent 340 is another remote host #i+1 if i≠k (that is, if the mobile agent 340 has not visited k remotes hosts yet). If i=k (that is, if the mobile agent 340 has already visited k remote hosts), the mobile agent 340 returns to the remote host #1 310 (step B11, step B12, step B13, step B14). The remote host to be visited by the mobile agent 340 next in the case where i≠k has been determined before the visit to the remote host #i, or is determined dynamically by the remote host #i during the visit to the remote host #i.

After the mobile agent 340 reached the remote host #1 310 again, the remote host #1 310 inputs all or part of the data which have been stored in the intermediate data storage section 341 and the secret key #1 315 of the remote host #1 310 to the partial signature calculation section 312, and thereby calculates a partial signature which will be used when the digital signature for the signature target data by use of the newly generated secret key is calculated (step B15).

After the calculation of the partial signature is completed, if the data stored in the intermediate data storage section 341 have been encrypted, the remote host #1 310 inputs the encrypted data and the secret key #1 315 of the remote host #1 310 to the public key cryptography calculation section 314 and thereby decrypts the data. The remote host #1 310 verifies the signatures which have been added to the data by inputting the decrypted data and public keys of the remote hosts (that generated the signatures) to the public key cryptography calculation section 314. If the data stored in the intermediate data storage section 341 have not been encrypted, the remote host #1 310 verifies the signatures which have been added to the data by inputting the data and the public keys of the remote hosts (that generated the signatures) to the public key cryptography calculation section 314, and thereby ascertains that the data have not been tampered (step B16).

At the point when the verification of all the signatures added to the data is finished, the remote host #1 310 has obtained partial signatures which have been calculated by the visited remote hosts (1≦i≦k). The remote host #1 310 inputs all or part of the obtained partial signatures to the partial signature combining section 313, thereby the digital signature for the signature target data by use of the newly generated secret key (which has been generated by the partial signature auxiliary data generation section 304 of the base host 300) is obtained (step B17).

Thereafter, the remote host #1 310 stores the aforementioned three pieces of data: the obtained digital signature; the newly generated public key which has been stored in the intermediate data storage section 341 of the mobile agent 340; and the digital signature calculated for the newly generated public key by use of the secret key #0 303 of the owner of the mobile agent, in the data storage section 316 (in other words, the digital signature for the signature target data is presented to the remote host #1 310), and the mobile agent 340 returns to the base host 300 (step B18).

According to the second embodiment which has been explained above, the following effects can be obtained. The digital signature obtained by the above process is a digital signature whose integrity can always be verified by use of the public key of the owner of the mobile agent 340, regardless of which hosts the mobile agent 340 visited and regardless of the order of visiting. As for the possibility of forgery of the digital signature, calculations by use of secret keys of k remote hosts are necessary for generating the digital signature of the owner of the mobile agent 340, therefore, the forgery of the digital signature can be prevented unless k remote hosts conspire together.

Further, even when k remote hosts conspired together, only the newly generated secret key (which has been generated by the base host 300) is known by the k remote hosts, therefore, the secret key #0 303 of the owner of the mobile agent 340 is protected from being known by the maliciously conspiring k remote hosts.

Embodiment 3

In the following, a third embodiment of the present invention will be explained. The third embodiment is basically the same as the first embodiment, except that the partial signature calculation sections 112, 122, 132, . . . of the remote hosts #i (1≦i≦n) are implemented by program code of the mobile agent 140.

In the third embodiment, the secret keys #i of the remote hosts #i (1≦i≦k) are supplied to the program code of the mobile agent 140 as input data, therefore, in order to protect the secret keys #i from being known by the owner of the mobile agent 140 and other remote hosts, the program code of the mobile agent 140 and the information concerning the secret key that is stored in the intermediate data storage section 141 have to be deleted before the mobile agent 140 moves to the next host.

Embodiment 4

In the following, a fourth embodiment of the present invention will be explained. The fourth embodiment is basically the same as the first embodiment, except that the partial signature combining sections 113, 123, 133, . . . of the remote hosts #i (1≦i≦n) are implemented by program code of the mobile agent 140.

Embodiment 5

In the following, a fifth embodiment of the present invention will be explained. The fifth embodiment is basically the same as the first embodiment, except that the public key cryptography calculation sections 114, 124, 134, . . . of the remote hosts #i ($1 \leq i \leq n$) are implemented by program code of the mobile agent 140.

Embodiment 6

In the following, a sixth embodiment of the present invention will be explained. The sixth embodiment is basically the same as the first embodiment, except that the partial signature calculation sections 112, 122, 132, . . . and the partial signature combining sections 113, 123, 133, . . . of the remote hosts #i ($1 \leq i \leq n$) are implemented by program code of the mobile agent 140.

Embodiment 7

In the following, a seventh embodiment of the present invention will be explained. The seventh embodiment is basically the same as the first embodiment, except that the partial signature combining sections 113, 123, 133, . . . and the public key cryptography calculation sections 114, 124, 134, . . . of the remote hosts #i ($1 \leq i \leq n$) are implemented by program code of the mobile agent 140.

Embodiment 8

In the following, an eighth embodiment of the present invention will be explained. The eighth embodiment is basically the same as the first embodiment, except that the partial signature calculation sections 112, 122, 132, . . . and the public key cryptography calculation sections 114, 124, 134, . . . of the remote hosts #i ($1 \leq i \leq n$) are implemented by program code of the mobile agent 140.

Embodiment 9

In the following, a ninth embodiment of the present invention will be explained. The ninth embodiment is basically the same as the first embodiment, except that the partial signature calculation sections 112, 122, 132, . . . , the partial signature combining sections 113, 123, 133, . . . and the public key cryptography calculation sections 114, 124, 134, . . . of the remote hosts #i ($1 \leq i \leq n$) are implemented by program code of the mobile agent 140.

Embodiment 10

In the following, a tenth embodiment of the present invention will be explained. The tenth embodiment is basically the same as the second embodiment, except that the partial signature calculation sections 312, 322, 332, . . . of the remote hosts #i ($1 \leq i \leq n$) are implemented by program code of the mobile agent 340.

In the fifth through tenth embodiments which have been described above, the secret keys #i of the remote hosts #i ($1 \leq i \leq k$) are supplied to the program code of the mobile agent (140, 340) as input data, therefore, in order to protect the secret keys #i from being known by the owner of the mobile agent (140, 340) and other remote hosts, the program code of the mobile agent (140, 340) and the information concerning the secret key that is stored in the intermediate data storage section (141, 341) have to be deleted before the mobile agent (140, 340) moves to the next host.

Embodiment 11

In the following, an eleventh embodiment of the present invention will be explained. The eleventh embodiment is basically the same as the second embodiment, except that the partial signature combining sections 313, 323, 333, . . . of the remote hosts #i ($1 \leq i \leq n$) are implemented by program code of the mobile agent 340.

Embodiment 12

In the following, a twelfth embodiment of the present invention will be explained. The twelfth embodiment is basically the same as the second embodiment, except that the public key cryptography calculation sections 314, 324, 334, . . . of the remote hosts #i ($1 \leq i \leq n$) are implemented by program code of the mobile agent 340.

Embodiment 13

In the following, a thirteenth embodiment of the present invention will be explained. The thirteenth embodiment is basically the same as the second embodiment, except that the partial signature calculation sections 312, 322, 332, . . . and the partial signature combining sections 313, 323, 333, . . . of the remote hosts #i ($1 \leq i \leq n$) are implemented by program code of the mobile agent 340.

Embodiment 14

In the following, a fourteenth embodiment of the present invention will be explained. The fourteenth embodiment is basically the same as the second embodiment, except that the partial signature combining sections 313, 323, 333, . . . and the public key cryptography calculation sections 314, 324, 334, . . . of the remote hosts #i ($1 \leq i \leq n$) are implemented by program code of the mobile agent 340.

Embodiment 15

In the following, a fifteenth embodiment of the present invention will be explained. The fifteenth embodiment is basically the same as the second embodiment, except that the partial signature calculation sections 312, 322, 332, . . . and the public key cryptography calculation sections 314, 324, 334, . . . of the remote hosts #i ($1 \leq i \leq n$) are implemented by program code of the mobile agent 340.

Embodiment 16

In the following, a sixteenth embodiment of the present invention will be explained. The sixteenth embodiment is basically the same as the second embodiment, except that the partial signature calculation sections 312, 322, 332, . . . , the partial signature combining sections 313, 323, 333, . . . and the public key cryptography calculation sections 314, 324, 334, . . . of the remote hosts #i ($1 \leq i \leq n$) are implemented by program code of the mobile agent 340.

In the twelfth through sixteenth embodiments which have been described above, the secret keys #i of the remote hosts #i ($1 \leq i \leq k$) are supplied to the program code of the mobile agent 340 as input data, therefore, in order to protect the secret keys #i from being known by the owner of the mobile agent 340 and other remote hosts, the program code of the mobile agent 340 and the information concerning the secret key that is stored in the intermediate data storage section 341 have to be deleted before the mobile agent 340 moves to the next host.

In short, in the third through sixteenth embodiment of the present invention, one or more components selected from the partial signature calculation section, the partial signature combining section and the public key cryptography calculation section are omitted from each remote host #i, and the omitted components are provided to the mobile agent (140, 340).

In the following, two concrete examples with regard to the first embodiment and the second embodiment will be explained in detail. In the following two examples, "RSA signature scheme" is employed for the signature calculation. A detailed explanation for the RSA signature scheme has been given in pages 433–438 of a handbook: A. Menezes, P. Oorschot, S. Vanstone "Handbook of Applied Cryptography", CRC Press, 1997, ISBN 0-8493-8523-7.

The "RSA signature scheme", "(k, n) threshold secret sharing scheme" and "ElGamal cryptosystem" which are employed in the two examples for information security will hereafter be explained briefly.

First, the RSA signature scheme will be explained briefly. In the RSA signature scheme, a number "n"=p×q (p, q: prime number of approximately 512 bits) and a number "e" which is relatively prime with 1 cm (p−1, q−1) (1 cm: least common multiple) are used. A combination (n, e) is used as a public key, and a number "d" that satisfies:

$$ed=1 \quad (\text{mod } 1 \text{ cm } (p-1, q-1))$$

is used as a secret key.

If we assume that "M" is a message (a number) to which a signature S has to be added, the signature S is given as:

$$S=M^d \quad (\text{mod } n).$$

A person who received a combination (M, S) of the message M and the signature S can verify the integrity of the message by ascertaining that (M, S) satisfies:

$$M=S^e \quad (\text{mod } n).$$

Next, the (k, n) threshold secret sharing scheme will be explained briefly. The (k, n) threshold secret sharing scheme is a scheme for supplying n participants with distributed information concerning a secret S so as to satisfy the following two conditions:

(1) Information concerning the secret S can not be obtained at all when less than k participants gather and disclose their distributed information.

(2) The secret S can be restored uniquely when k or more participants gather and disclose their distributed information.

As for the implementation of the (k, n) threshold secret sharing scheme, a detailed explanation has been given in pages 525 and 526 of the aforementioned handbook.

An implementation of the (k, n) threshold secret sharing scheme by use of a polynomial will hereafter be explained briefly.

When there is secret data S ($1 \leq S < q$, q: prime number) that should be shared among n participants, a trusted third party chooses a polynomial f(x) of the following type randomly:

$$f(x)=S+c_1 x+c_2 x^2+ \ldots +c_{k-1}x^{k-1} \quad (\text{mod } q),$$

and supplies each participant #i ($1 \leq i \leq n$) with distributed information $v_i = f(i)$.

If the distributed information $v_i = f(i)$ for each participant #i ($1 \leq i \leq n$) is set as above, both of the aforementioned two conditions (1) and (2) are satisfied. When k participants $a_1$, $a_2$, ... $a_k$ gathered and disclosed their distributed information $v_{a1}$, $v_{a2}$, ..., $v_{ak}$, the secret data S are restored as follows:

$$S = \sum_{j=1}^{k} Laj \ vaj \, (\text{mod } q)$$

where:

$$Laj = \prod_{1 \leq m \leq k, m \neq j} \frac{am}{aj - am} (\text{mod } q)$$

Next, the ElGamal cryptosystem will be explained briefly. A detailed explanation for the ElGamal cryptosystem has been given in pages 294–298 of the aforementioned handbook.

Hereafter, a public key, a secret key, an encrypting method and a decrypting method according to the ElGamal cryptosystem will be explained briefly. In the ElGamal cryptosystem, a prime number "p" of approximately 512 bits and a generator "g" of a cyclic group of modulo p are defined as domain parameters. A number "x" ($0 \leq x < p$) is defined as the secret key, and a number "y"=$g^x$ (mod p) is defined as the public key.

If we assume that "m" is a message (a number) which should be encrypted, the sender of the message m chooses a random number r, calculates G=$g^r$, M=$my^r$ by use of the public key y of the receiver of the message m, and sends (G, M) as a cipher text to the receiver. The receiver who received the cipher text (G, M) decrypts the message by calculating m=M/$G^x$ by use of the receiver's secret key x.

In the following two examples, the owner of the mobile agent holds an RSA secret key $d_A$ and a corresponding public key $e_A$. Each remote host #i ($1 \leq i \leq n$) also holds an RSA secret key $d_i$ and a corresponding public key $e_i$, respectively.

Further, k−1 ElGamal cryptosystem public keys $y_j$ ($1 \leq j < k$) are employed, and corresponding secret keys $x_j$ ($1 \leq j < k$) are distributed to each remote host #i ($1 \leq i \leq n$) by use of a (j+1, n) threshold secret sharing scheme. Hereafter, distributed information (concerning the ElGamal cryptosystem secret key $x_j$) that is held by the remote host #i ($1 \leq i \leq n$) will be expressed as $v_{ij}$. Concretely, the distributed information $v_{ij}$ is expressed by use of the aforementioned secret sharing polynomial f(x) as follows:

$$v_{ij}=f_j(i)=x_j+c_1 i+c_2 i^2+ \ldots +c_j i^j \quad (\text{mod } p)$$

EXAMPLE 1

On the above background, the first example will be explained in detail referring to FIGS. 5 and 6. The first example is an example in which the RSA signature scheme is employed for signature calculation in the first embodiment of the present invention.

Figure 5:
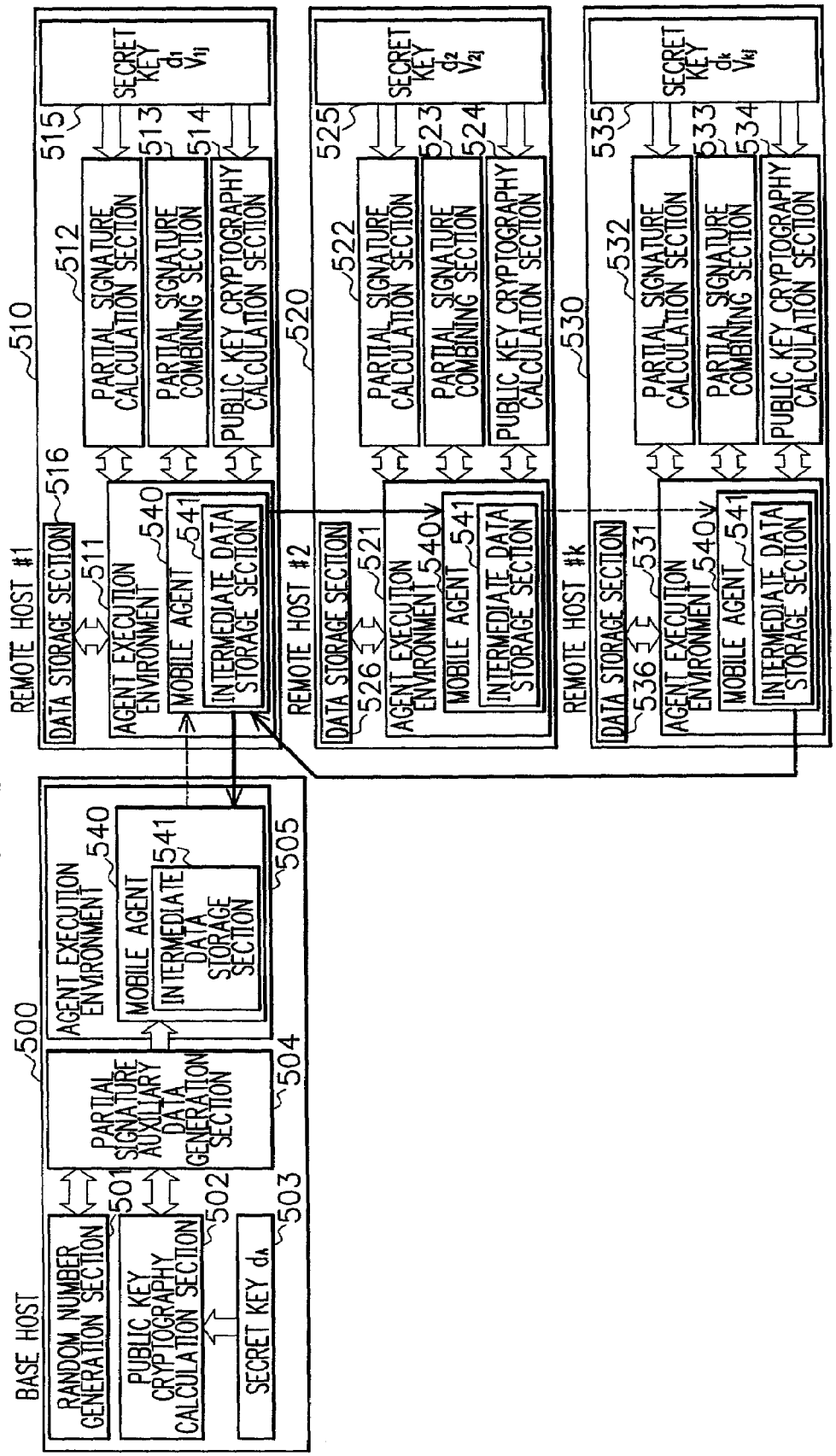
FIG. 5 is a block diagram showing the composition of a signature calculation system as a first concrete example of the present invention.
Figure 6:
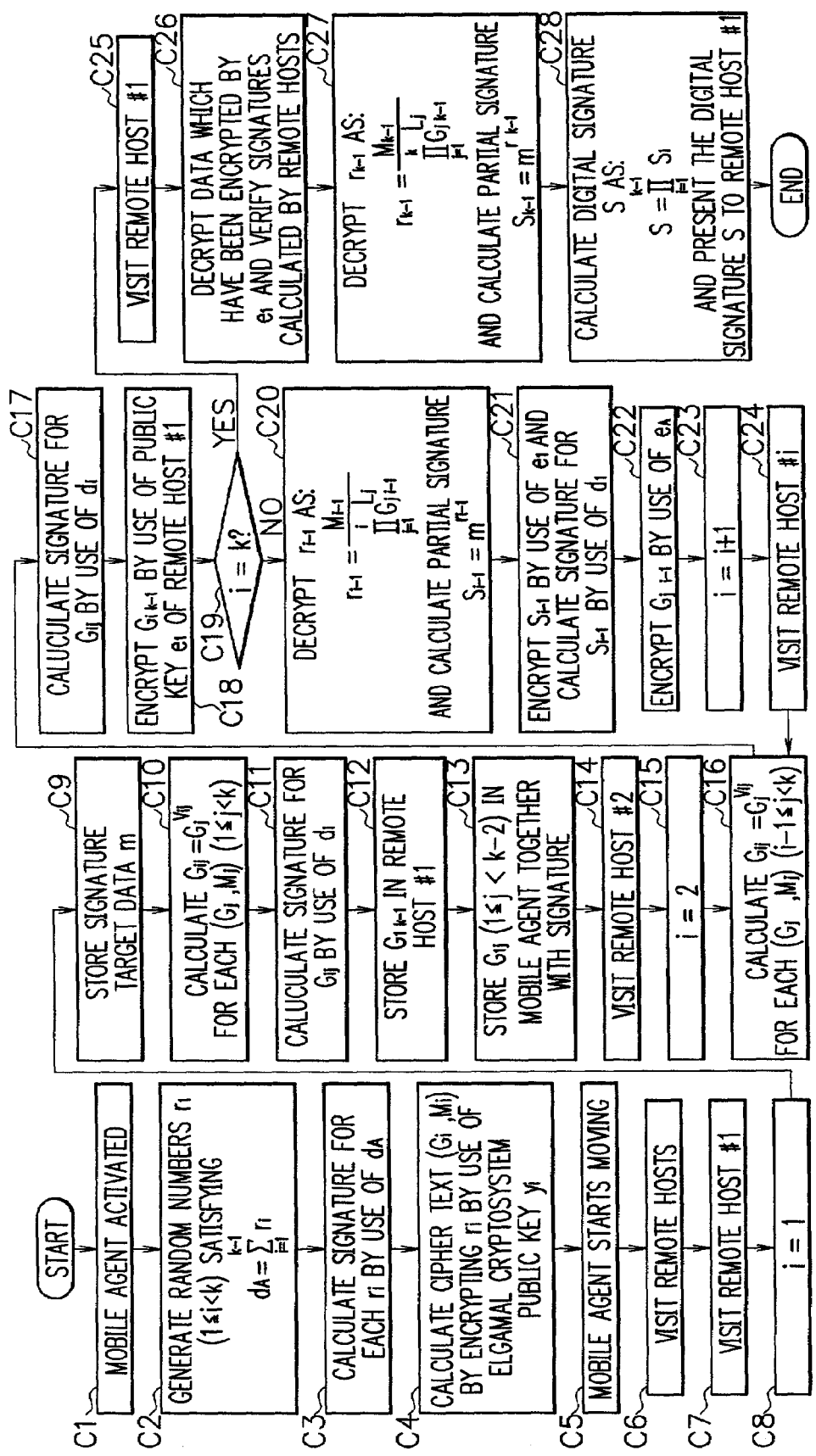
FIG. 6 is a flow chart for explaining the operation of the signature calculation system of FIG. 5.

FIG. 5 is a block diagram showing the composition of a signature calculation system of the first example. Components 500–541 of the signature calculation system of FIG. 5 correspond to the components 100–141 of the signature calculation system of FIG. 1, and thus repeated description thereof is omitted. Referring to FIG. 5, the RSA secret key $d_A$ which is held by the base host 500 and the RSA secret keys $d_i$ ($1 \leq i \leq n$) which are held by the remote hosts #i respectively are shown. The distributed information $v_{ij}$ ($1 \leq j < k$) concerning the ElGamal cryptosystem secret keys $x_j$ ($1 \leq j < k$) which is held by each remote host #i is also shown in FIG. 5. FIG. 6 is a flow chart for explaining the operation of the signature calculation system of FIG. 5.

First, a mobile agent 540 is activated in the base host 500 (step C1).

The partial signature auxiliary data generation section 504 receives the RSA secret key $d_A$ (that is, the secret key #0 of the owner of the mobile agent 540) and a random number which is supplied from the random number generation section 501, and thereby generates random numbers $r_i$ ($1 \leq i < k$) that satisfy:

$$d_A = \sum_{i=1}^{k-1} ri \ (\text{mod lcm} \ (p-1, q-1))$$

(step C2). The random numbers $r_i$ ($1 \leq i < k$) are generated in order to partition and distribute the information of the RSA secret key $d_A$ to the remote hosts #i.

For each of the generated random numbers $r_i$, a signature is calculated by use of the RSA secret key $d_A$ (step C3). Each random number $r_i$ is encrypted by use of the ElGamal cryptosystem public key $y_i$ and thereby a cipher text ($G_i$, $M_i$) is calculated (step C4). Thereafter, the cipher texts ($G_i$, $M_i$) and the signatures for the random numbers $r_i$ (that is, partial signature auxiliary data) are stored in the intermediate data storage section 541 of the mobile agent 540.

After the storage of the partial signature auxiliary data is completed, the mobile agent 540 starts moving (step C5). The mobile agent 540 dynamically visits 0 or more remote hosts (step C6) and thereafter reaches the remote host #1 510 (step C7, step C8). At the remote host #1 510, the mobile agent 540 determines to calculate a digital signature for a signature target data "m" which is presented by the remote host #1 510, and stores the signature target data "m" in the intermediate data storage section 541 (step C9).

Subsequently, the remote host #1 510 inputs the cipher texts ($G_i$, $M_i$) ($1 \leq i < k$) (which have been calculated by the base host 500 in the step C4 and stored in the intermediate data storage section 541) to the partial signature calculation section 512 and thereby calculates $G_{1j}$ as follows (step C10):

$$G_{1j} = Gj^{v1j} \quad (\text{mod } p)$$

After calculating $G_{1j}$ ($1 \leq j < k$), the remote host #1 510 inputs $G_{1j}$ and the RSA secret key $d_1$ of the remote host #1 510 to the public key cryptography calculation section 514 and thereby calculates RSA digital signatures of the remote host #1 510 for $G_{1j}$ ($1 \leq j < k$) (step C11). After the calculation of the signatures, the remote host #1 510 stores $G_{1k-1}$ in its data storage section 516 (step C12) and stores remaining results $G_{1j}$ ($1 \leq j < k-1$) in the intermediate data storage section 541 of the mobile agent 540 together with the signatures (step C13).

After the above steps at the remote host #1 510 are finished, the mobile agent 540 visits the next remote host (step C14, step C15). The remote host to be visited by the mobile agent 540 next has been determined before the visit to the remote host #1 510, or is determined dynamically by the remote host #1 510 during the visit to the remote host #1 510. Hereafter, remote hosts which are visited by the mobile agent 540 after the visit to the remote host #1 510 will be referred to as "remote hosts #i (i=2, 3, 4) in order of visiting.

After the mobile agent 540 reached a remote host #i ($2 \leq i \leq k$), the remote host #i inputs the cipher texts ($G_j$, $M_j$) ($i-1 \leq j < k$) (which have been calculated by the base host 500 in the step C4 and stored in the intermediate data storage section 541) to its partial signature calculation section and thereby calculates $G_{ij}$ as follows (step C16):

$$G_{ij} = Gj^{vij} \quad (\text{mod } p)$$

After the calculation of $G_{ij}$ ($i-1 \leq j < k$), the remote host #i inputs the calculated $G_{ij}$ ($i-1 \leq j < k$) and the RSA secret key $d_i$ of the remote host #i to its public key cryptography calculation section and thereby calculates RSA signatures of the remote host #i for $G_{ij}$ ($i-1 \leq j < k$) (step C17), and encrypts $G_{ik-1}$ by use of the public key $e_1$ of the remote host #1 510 which presented the signature target data (step C18).

At this point, if the remote host #i which is currently visited by the mobile agent 540 is a remote host #k (that is, a k-th remote host after the visit to the remote host #1 510), the mobile agent 540 returns to the remote host #1 510 (step C19, step C25).

If the currently visited remote host #i is not the remote host #k, the remote host #i at this point holds i pieces of data $G_{ji-1}$ ($1 \leq j \leq i$): $G_{1i-1}$, $G_{2i-1}$, $G_{3i-1}$, $G_{ii-1}$.

Since:

$$G_{ji-1} = G_{i-1}^{vji-1} \quad (\text{mod } p)$$

holds and $v_{ji-1}$ is the distributed information of an (i, n) threshold secret sharing scheme, $$\prod_{j=1}^{i} G_{i-1,j}^{Lj} = G_{i-1}^{\sum_{j=1}^{i} L_j v_{ji-1}} = G_{i-1}^{x_{i-1}} \quad (\text{mod } p)$$

holds. Incidentally, $L_j$ in the above equation is defined by use of $a_j$ that satisfies $v_{ji-1} = f_{i-1}(a_j)$ as follows:

$$Lj = \prod_{1 \leq m \leq i, m \neq j} \frac{am}{am - aj} (\text{mod } q)$$

Comparing with the decrypting method of the ElGamal cryptosystem, $$\frac{M_{i-1}}{\prod_{j=1}^{i} G_{ji-1}^{Lj}} = \frac{M_{i-1}}{G_{i-1}^{X_{i-1}}} \quad (\text{mod } p)$$

holds. Therefore, by inputting $G_{1i-1}$, $G_{2i-1}$, $G_{3i-1}$, ... $G_{ii-1}$ to the partial signature calculation section and executing the above calculation, the random number $_{i-1}$ can be obtained. The partial signature calculation section, to which the signature target data m is further inputted, calculates and outputs the following partial signature $S_{i-1}$, (step C20):

$$S_{i-1} = m^{ri-1} \quad (\text{mod n})$$

where "n" in the above notation "(mod n)" means the product of the two prime numbers: (p×q (p, q: prime number of approximately 512 bits)).

After the partial signature $S_{i-1}$ is outputted by the partial signature calculation section, the remote host #i encrypts the partial signature $S_{i-1}$ by inputting the partial signature $S_{i-1}$ and the public key $e_1$ of the remote host #1 510 to its public key cryptography calculation section, calculates an RSA signature of the remote host #i for the partial signature $S_{i-1}$ by inputting the partial signature $S_{i-1}$ and the secret key $d_i$ of the remote host #i to its public key cryptography calculation section, and stores the encrypted partial signature and the RSA signature in the intermediate data storage section 541 of the mobile agent 540 (step C21).

The data $G_{ji-1}$, $(1 \leq j \leq i)$ which will not be referred to by subsequently visited remote hosts and the public key $e_A$ of the owner of the mobile agent 540 are inputted to the public key cryptography calculation section and thereby RSA cipher texts for the data $G_{ji-1}$ $(1 \leq j \leq i)$ are obtained. The RSA cipher texts for the data $G_{ji-1}$ $(1 \leq j \leq i)$ are stored in the intermediate data storage section 541 of the mobile agent 540 (step C22). The RSA cipher texts stored in the intermediate data storage section 541 will be used after the mobile agent 540 returned to the base host 500 by the owner of the mobile agent 540 for verifying the calculations which have been executed by the mobile agent 540.

After the data calculated by the remote host #i are stored in the intermediate data storage section 541, the mobile agent 540 visits the next remote host #i+1 (step C23, step C24). Incidentally, the process corresponds to the returning to the step C16 in FIG. 6.

After the mobile agent 540 which have visited k remote hosts (remote hosts #1~#k) returned to the remote host #1 510, the public key cryptography calculation section 514 of the remote host #1 510 conducts decryption of the data which have been encrypted by use of the public key $e_1$ of the remote host #1 510 and verification of all the verifiable signatures (step C26).

At the point when the decryption and the signature verification are finished, the remote host #1 510 has obtained k pieces of data $G_{jk-1}$ $(1 \leq j \leq k)$: $G_{1k-1}$, $G_{2k-1}$) . . . , $G_{kk-1}$. Similarly to the step C20, since:

$$G_{jk-1} = G_{k-1}^{v_{jk-1}} \quad (\text{mod } p)$$

holds and $v_{jk-1}$ is the distributed information of a (k, n) threshold secret sharing scheme, $$\prod_{j=1}^{k} G_{jk-1}^{L_j} = G_{k-1}^{\sum_{j=1}^{k} L_j v_{jk-1}} = G_{k-1}^{x_{k-1}} \quad (\text{mod } p)$$

holds. Comparing with the decrypting method of the ElGamal cryptosystem, $$r_{k-1} = \frac{M_{k-1}}{\prod_{j=1}^{k} G_{jk-1}^{L_j}} = \frac{M_{k-1}}{G_{k-1}^{x_{k-1}}} (\text{mod } p)$$

holds. Therefore, by inputting $G_{1k-1}$, $G_{2k-1}$, $G_{3k-1}$, . . . , $G_{kk-1}$ to the partial signature calculation section 512 and executing the above calculation, the random number $r_{k-1}$ can be obtained. The partial signature calculation section 512, to which the signature target data m is further inputted, calculates and outputs the following partial signature $S_{k-1}$ (step C27):

$$S_{k-1} = m^{r_{k-1}} \quad (\text{mod } n)$$

At the point when the above step C27 is finished, the remote host #1 510 has obtained k-i partial signatures $S_1$, $S_2$, . . . , $S_{k-1}$.

Since each partial signature $S_i$ satisfies:

$$S_i = m^{r_i} \quad (\text{mod } n)$$

and the following equation:

$$d_A = \sum_{i=1}^{k-1} ri(\text{mod lcm}(p-1, q-1))$$

holds, by letting the partial signature combining section 513 calculate:

$$\prod_{i=1}^{k-1} S_i = m^{\sum_{i=1}^{k-1} r_i} m^{d_A} \quad (\text{mod } n)$$

an RSA digital signature $S = m^{d_A}$ for the signature target data m (which has been presented dynamically and arbitrarily by the remote host #1 510) by use of the RSA secret key $d_A$ of the owner of the mobile agent 540 can be obtained.

The remote host #1 510 stores the RSA digital signature S in the data storage section 516 as a signature by the mobile agent 540 for the signature target data m (in other words, the RSA digital signature for the signature target data m is presented to the remote host #1 510). Thereafter, the mobile agent 540 which finished the calculation of the digital signature S returns to the base host 500 (step C28).

EXAMPLE 2

Figure 8:
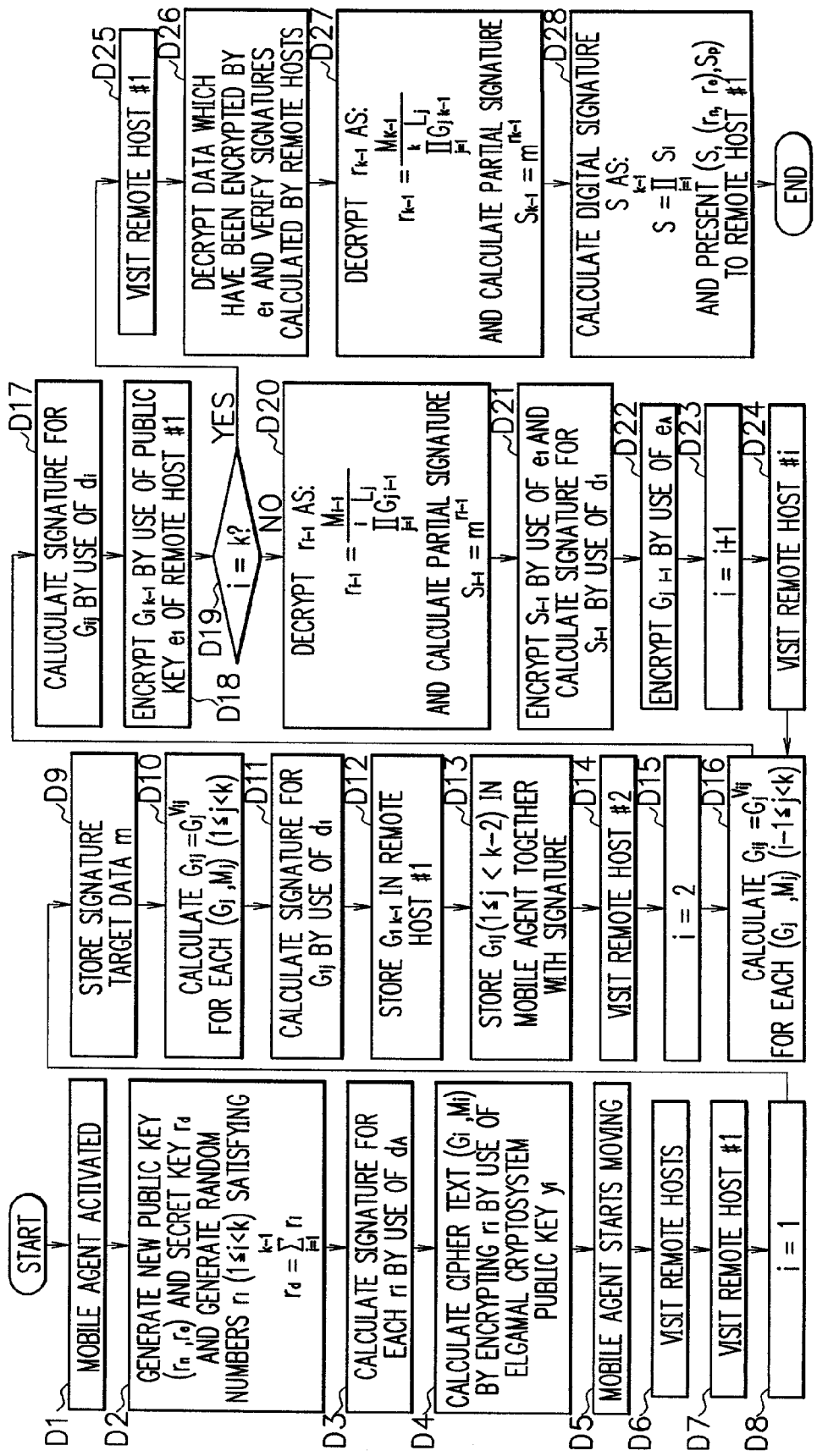
FIG. 8 is a flow chart for explaining the operation of the signature calculation system of FIG. 7.

In the following, the second example will be explained in detail referring to FIGS. 7 and 8. The second example is an example in which the RSA signature scheme is employed for signature calculation in the second embodiment of the present invention.

FIG. 7 is a block diagram showing the composition of a signature calculation system of the second example. Components 700~741 of the signature calculation system of FIG. 7 correspond to the components 300~341 of the signature calculation system of FIG. 3, and thus repeated description thereof is omitted. FIG. 8 is a flow chart for explaining the operation of the signature calculation system of FIG. 7.

The owner of the mobile agent 740 holds an RSA secret key $d_A$ and a corresponding public key $e_A$. Each remote host #i $(1 \leq i \leq n)$ also holds an RSA secret key $d_i$ and a corresponding public key $e_i$, respectively. Further, k−1 ElGamal cryptosystem public keys $y_j$ $(1 \leq j < k)$ are employed, and corresponding secret keys $x_j$ $(1 \leq j < k)$ are distributed to each remote host #i $(1 \leq i \leq n)$ by use of a (j+1, n) threshold secret sharing scheme. Hereafter, distributed information (concerning the ElGamal cryptosystem secret key $x_j$) that is held by the remote host #i $(1 \leq i \leq n)$ will be expressed as $v_{ij}$. Concretely, the distributed information $v_{ij}$ is expressed by use of the aforementioned secret sharing polynomial f(x) as follows:

$$v_{ij} = f_j(i) = x_j + c_1 i + c_2 i^2 + \ldots + c_j i^j \quad (\text{mod } p)$$

First, a mobile agent 740 is activated in the base host 700 (step D1).

The partial signature auxiliary data generation section 704 receives a random number outputted by the random number generation section 701 and generates a new RSA public key (rn, re), a new RSA secret key rd, and random numbers $r_i$ $(1 \leq i < k)$ that satisfy:

$$rd = \Sigma r_i \quad (\text{mod lcm } (rp-1, rq-1))$$

(step D2). Incidentally, the numbers rp and rq are prime numbers that satisfy rn=rp×rq. The random numbers $r_i$ ($1 \leq i < k$) are generated in order to partition and distribute the information of the RSA secret key rd to the remote hosts #i.

For the newly generated RSA public key (rn, re) and random numbers $r_i$, signatures are calculated by use of the RSA secret key $d_A$ (step D3). Each random number $r_i$ is encrypted by use of the ElGamal cryptosystem public key $y_i$ and thereby a cipher text ($G_i$, $M_i$) is calculated (step D4). Thereafter, the new RSA public key (rn, re), the signature $S_p$ for the new RSA public key (rn, re), the cipher texts ($G_i$, $M_i$) and the signatures for the random numbers $r_i$ (that is, partial signature auxiliary data) are stored in the intermediate data storage section 741 of the mobile agent 740.

After the storage of the partial signature auxiliary data is completed, the mobile agent 740 starts moving (step D5). The mobile agent 540 dynamically visits 0 or more remote hosts (step D6) and thereafter reaches the remote host #1 710 (step D7, step D8). At the remote host #1 710, the mobile agent 740 determines to calculate a digital signature for a signature target data "m" which is presented by the remote host #1 710, and stores the signature target data "m" in the intermediate data storage section 741 (step D9).

Subsequently, the remote host #1 710 inputs the cipher texts ($G_i$, $M_i$) ($1 \leq i < k$) (which have been calculated by the base host 700 in the step D4 and stored in the intermediate data storage section 741) to the partial signature calculation section 712 and thereby calculates $G_{1j}$ as follows (step D10):

$$G_{1j} = G_j^{v_{1j}} \pmod{p}$$

After calculating $G_{1j}$ ($1 \leq j < k$), the remote host #1 710 inputs $G_{1j}$ and the RSA secret key $d_1$ of the remote host #1 710 to the public key cryptography calculation section 714 and thereby calculates RSA digital signatures of the remote host #1 710 for $G_{1j}$ ($1 \leq j < k$) (step D11). After the calculation of the signatures, the remote host #1 710 stores $G_{1k-1}$ in its data storage section 716 (step D12) and stores remaining results $G_{1j}$ ($1 \leq j < k-1$) in the intermediate data storage section 741 of the mobile agent 740 together with the signatures (step D13).

After the above steps at the remote host #1 710 are finished, the mobile agent 740 visits the next remote host (step D14, step D15). The remote host to be visited by the mobile agent 740 next has been determined before the visit to the remote host #1 710, or is determined dynamically by the remote host #1 710 during the visit to the remote host #1 710. Hereafter, remote hosts which are visited by the mobile agent 740 after the visit to the remote host #1 710 will be referred to as "remote hosts #i (i=2, 3, 4) in order of visiting.

After the mobile agent 740 reached a remote host #i ($2 \leq i \leq k$), the remote host #i inputs the cipher texts ($G_j$, $M_j$) ($i-1 \leq j < k$) (which have been calculated by the base host 700 in the step D4 and stored in the intermediate data storage section 741) to its partial signature calculation section and thereby calculates $G_{ij}$ as follows (step D16):

$$G_{ij} = G_j^{v_{ij}} \pmod{p}$$

After the calculation of $G_{ij}$ ($i-1 \leq j < k$), the remote host #i inputs the calculated $G_{ij}$ ($i-1 \leq j < k$) and the RSA secret key $d_i$ of the remote host #i to its public key cryptography calculation section and thereby calculates RSA signatures of the remote host #i for $G_{ij}$ ($i-1 \leq j < k$) (step D17), and encrypts $G_{ik-1}$ by use of the public key $e_1$ of the remote host #1 710 which presented the signature target data (step D18).

At this point, if the remote host #i which is currently visited by the mobile agent 740 is a remote host #k (that is, a k-th remote host after the visit to the remote host #1 710), the mobile agent 740 returns to the remote host #1 710 (step D19, step D25).

If the currently visited remote host #i is not the remote host #k, the remote host #i at this point holds i pieces of data $G_{ji-1}$ ($1 \leq j \leq i$): $G_{1i-1}$, $G_{2i-1}$, $G_{3i-1}$, ..., $G_{ii-1}$.

Since:

$$G_{ji-1} = G_{i-1}^{v_{ji-1}} \pmod{p}$$

holds and $v_{ji-1}$ is the distributed information of an (i, n) threshold secret sharing scheme, $$\prod_{j=1}^{i} G_{i-1}^{L_j} = G_{i-1}^{\sum_{j=1}^{i} L_j v_{ji-1}} = G_{i-1}^{X_{i-1}} \pmod{p}$$

holds. Incidentally, $L_j$ in the above equation is defined by use of $a_j$ that satisfies $v_{ji-1} = f_{i-1}(a_j)$ as follows:

$$L_j = \prod_{1 \leq m \leq i, m \neq j} \frac{am}{am - aj} \pmod{q}$$

Comparing with the decrypting method of the ElGamal cryptosystem, $$\frac{M_{i-1}}{\prod_{j=1}^{i} G_{ji-1}^{L_j}} = \frac{M_{i-1}}{G_{i-1}^{X_{i-1}}} \pmod{p}$$

holds. Therefore, by inputting $G_{1i-1}$, $G_{2i-1}$, $G_{3i-1}$, ..., $G_{ii-1}$ to the partial signature calculation section and executing the above calculation, the random number $r_{i-1}$ can be obtained. The partial signature calculation section, to which the signature target data m is further inputted, calculates and outputs the following partial signature $S_{i-1}$ (step D20):

$$S_{i-1} = m^{r_{i-1}} \pmod{n}$$

where "n" in the above notation "(mod n)" means the product of the two prime numbers: (p×q (p, q: prime number of approximately 512 bits)).

After the partial signature $S_{i-1}$ is outputted by the partial signature calculation section, the remote host #i encrypts the partial signature $S_{i-1}$ by inputting the partial signature $S_{i-1}$ and the public key $e_1$ of the remote host #1 710 to its public key cryptography calculation section, calculates an RSA signature of the remote host #i for the partial signature $S_{i-1}$ by inputting the partial signature $S_{i-1}$ and the secret key $d_i$ of the remote host #i to its public key cryptography calculation section, and stores the encrypted partial signature and the RSA signature in the intermediate data storage section 741 of the mobile agent 740 (step D21).

The data $G_{ji-1}$ ($1 \leq j \leq i$) which will not be referred to by subsequently visited remote hosts and the public key $e_A$ of the owner of the mobile agent 740 are inputted to the public key cryptography calculation section and thereby RSA cipher texts for the data $G_{ji-1}$ ($1 \leq j \leq i$) are obtained. The RSA cipher texts for the data $G_{ji-1}$ ($1 \leq j \leq i$) are stored in the intermediate data storage section 741 of the mobile agent 740 (step D22). The RSA cipher texts stored in the intermediate data storage section 741 will be used after the mobile agent 740 returned to the base host 700 by the owner of the mobile agent 740 for verifying the calculations which have been executed by the mobile agent 740.

After the data calculated by the remote host #i are stored in the intermediate data storage section 741, the mobile agent 740 visits the next remote host #i+1 (step D23, step D24). Incidentally, the process corresponds to the returning to the step D16 in FIG. 8.

After the mobile agent 740 which have visited k remote hosts (remote hosts #1~#k) returned to the remote host #1 710, the public key cryptography calculation section 714 of the remote host #1 710 conducts decryption of the data which have been encrypted by use of the public key $e_1$ of the remote host #1 710 and verification of all the verifiable signatures (step D26).

At the point when the decryption and the signature verification are finished, the remote host #1 710 has obtained k pieces of data $G_{jk-1}$ ($1 \leq j \leq k$): $G_{1k-1}, G_{2k-1}, \ldots, G_{kk-1}$. Similarly to the step D20, since:

$$G_{jk-1} = G_{k-1}^{v_{jk-1}} \pmod{p}$$

holds and $V_{jk-1}$ is the distributed information of a (k, n) threshold secret sharing scheme, $$\prod_{j=1}^{k} G_{jk-1}^{L_j} = G_{k-1}^{\sum_{j=1}^{k} L_j v_{jk-1}} = G_{k-1}^{x_{k-1}} \pmod{p}$$

holds. Comparing with the decrypting method of the ElGamal cryptosystem, $$r_{k-1} = \frac{M_{k-1}}{\prod_{j=1}^{k} G_{jk-1}^{L_j}} = \frac{M_{k-1}}{G_{k-1}^{x_{k-1}}} \pmod{p}$$

holds. Therefore, by inputting $G_{1k-1}, G_{2k-1}, G_{3k-1}, \ldots, G_{kk-1}$ to the partial signature calculation section 712 and executing the above calculation, the random number $r_{k-1}$ can be obtained. The partial signature calculation section 712, to which the signature target data m is further inputted, calculates and outputs the following partial signature $S_{k-1}$ (step D27):

$$S_{k-1} = m^{r_{k-1}} \pmod{n}$$

At the point when the above step D27 is finished, the remote host #1 710 has obtained k−1 partial signatures $S_1, S_2, \ldots, S_{k-1}$.

Since each partial signature $S_i$ satisfies:

$$S_i = m^{r_i} \pmod{n}$$

and the following equation:

$$r_d = \sum_{i=1}^{k-1} r_i \pmod{\operatorname{lcm}(r_{p-1}, r_{q-1})}$$

holds, by letting the partial signature combining section 713 calculate:

$$\prod_{i=1}^{k-1} S_i = m^{\sum_{i=1}^{k-1} r_i} = m^{r_d} \pmod{r_n},$$

an RSA digital signature $S = m^{r_d}$ for the signature target data m (which has been presented dynamically and arbitrarily by the remote host #1 710) by use of the RSA secret key rd (which has been newly generated by the base host 700 of the mobile agent 740) can be obtained.

The remote host #1 710 stores the RSA digital signature S, the RSA public key (rn, re) (which has been newly generated by the base host 700 of the mobile agent 740) and the signature $S_P$ (for the RSA public key (rn, re) calculated by use of the secret key $d_A$ of the owner of the mobile agent 740) in the data storage section 716 as a signature by the mobile agent 740 for the signature target data m (in other words, the signature (S, (rn, re), $S_P$) for the signature target data m is presented to the remote host #1 710). Thereafter, the mobile agent 740 which finished the calculation of the digital signature S returns to the base host 700 (step D28).

In the above embodiments and examples, the processes which are conducted by each base host (100, 300, 500, 700) are generally executed by a computer system (the base host) according to a program which is stored in a record medium. The processes which are conducted by each remote host (110, 310, 510, 710, . . . ) are also executed by a computer system (the remote host) according to a program which is stored in a record medium. As such record mediums, various types of data storage disks (CD ROMs etc.), semiconductor record mediums (ROM etc.), magnetic record mediums (HDDs, floppy disks), etc. can be employed.

In the following, the signature calculation system of the present invention will be compared with the aforementioned conventional technique disclosed in International Publication No.WO96/39765.

In the conventional techniques disclosed in claims 1 through 3 of the document, information concerning a secret key of "a predetermined entity" is distributed to and managed by "a predetermined number ($t_0$: constant) of designated facilities", and by combining partial signatures which have been calculated for a signature target data by two or more designated facilities having the distributed information, a digital signature for the signature target data can be calculated correctly.

A technique disclosed in claim 4 of the above document aims to temporarily give "a predetermined number ($t_0$: constant) of designate facilities" authority to calculate a signature of "an entity (which can also be interpreted as an unspecified entity)". Distributed (partial) information concerning the secret key of "an entity" is distributed to "a predetermined number of designated facilities", and by combining partial signatures which have been calculated for a signature target data by two or more designated facilities having the distributed information, a digital signature for the signature target data can be calculated correctly.

On the other hand, the signature calculation system of the present invention aims to give "unspecified designated facilities (that is, remote hosts in the present invention which can not be previously known by the mobile agent)" authority to calculate a digital signature by use of the secret key #0 of "an unspecified entity (that is, the owner of the mobile agent in the present invention)", and a correct digital signature can be calculated regardless of which remote hosts out of the unspecified remote hosts calculated the partial signatures. As mentioned above, the mobile agent before starting from the base host can not know the remote hosts that will calculate the partial signatures.

Of course it is also possible to employ the claim 4 of the above document for a purpose that is different from the original purpose and thereby give "unspecified designated facilities" authority to calculate the digital signature. For example, it is also possible to calculate distributed (partial) information concerning the secret key for any possible combination of $t_0$ designated facilities that can be chosen from all the designated facilities (to which the authority to calculate the digital signature can be given). However, in the cases where the number of the designated facilities (to which the authority to calculate the digital signature can be given) is very large as considered in the present invention, the technique of the claim 4 of the above document has considerable demerits from the viewpoint of efficiency.

As for the size of the data carried by the mobile agent which visits the designated facilities (hosts), the data size becomes proportional to $t_0$ according to the present invention, whereas the data size becomes proportional to $t_0 \times nCt_0$ ($nCt_0$: the number of possible combinations when $t_0$ designated facilities are choosed from n designated facilities) in the techniques of the above document when the n designated facilities (to which the authrity to calculate the digital signature can be given) are made unspecified.

To sum up:
(1) The signature calculation systems of the present invention, in which designated facilities that calculate the partial signature are unspecified, are designed with aims totally different from those of the techniques of the above document.
(2) Even if the technique of the above document is applied to cases where designated facilities that calculate the partial signature are unspecified, the technique has considerable problems in efficiency. In such cases, the signature calculation systems of the present invention are much advantageous.

As set forth hereinabove, by the signature calculation system by use of a mobile agent in accordance with the present invention, a digital signature for a signature target data (which is arbitrarily presented by a remote host to the dynamically moving mobile agent) by use of the secret key of the owner of the mobile agent can be calculated by the mobile agent while letting the mobile agent carry necessary data in a form capable of preventing the forgery of the digital signature (by use of the secret key of the owner of the mobile agent) unless k (k: constant) remote hosts conspire together.

For the calculation of the digital signature by the mobile agent, partial signatures calculated by k remote hosts are necessary. For the calculation of a partial signature, information concerning the secret key of a remote host is necessary. Calculations by use of k secret keys of k remote hosts become necessary in order to forge the digital signature, therefore, the forgery of the digital signature can be prevented unless k remote hosts conspire together.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A signature calculation system by use of a mobile agent, comprising:
   a mobile agent for calculating a digital signature of the owner of the mobile agent; a base host of the mobile agent from which the mobile agent starts moving in a network; and remote hosts in the network which can be visited by the mobile agent, wherein:
   the base host includes:
      an agent execution environment corresponding to the base host for letting the mobile agent execute its program code;
      a random number generation means for generating random numbers;
      a partial signature auxiliary data generation means to which the random numbers generated by the random number generation means and a secret key of the owner of the mobile agent are inputted and which generates partial signature auxiliary data for distributing the information of the secret key of the owner of the mobile agent to the remote hosts so that the partial signature auxiliary data will be used when partial signatures necessary for the calculation of the digital signature of the owner of the mobile agent are calculated by remote hosts; and
      a public key cryptography calculation means for conducting encryption and signature calculation for the partial signature auxiliary data generated by the partial signature auxiliary data generation means, and
   each remote host includes:
      an agent execution environment corresponding to the remote host for letting the mobile agent execute its program code;
      a partial signature calculation means to which signature target data, the signature target data being target data to which a digital signature of the owner is to be attached, data which have been carried by the mobile agent including the partial signature auxiliary data, and a secret key of the remote host are inputted and which calculates a partial signature which is necessary for the calculation of the digital signature of the owner of the mobile agent;
      a partial signature combining means to which one or more partial signatures calculated by one or more remote hosts are inputted and which outputs the digital signature calculated for the signature target data by use of the secret key of the owner of the mobile agent; and
   a public key cryptography calculation means for conducting encryption and signature calculation for the partial signature calculated by the partial signature calculation means, and
   the mobile agent, which started from the base host carrying the partial signature auxiliary data and which is arbitrarily presented with the signature target data by a remote host, stores the signature target data if the mobile agent determined to write the digital signature for the signature target data by use of the secret key of the owner of the mobile agent, and thereafter visits k (k: secunty parameter) remote hosts and carries the partial signatures calculated by the remote hosts to the remote host that presented the signature target data, at which the digital signature for the signature target data by use of the secret key of the owner of the mobile agent is obtained from the partial signatures calculated by the k remote hosts.

2. A signature calculation system by use of a mobile agent as claimed in claim 1, wherein one or more components of the remote host selected from the partial signature calculation means, the partial signature combining means and the public key cryptography calculation means are implemented by program code of the mobile agent.

3. A signature calculation system by use of a mobile agent as claimed in claim 1, wherein the partial signature auxiliary data generated by the partial signature auxiliary data generation means include cipher texts ($G_i$, $M_i$) ($1 \leq i < k$) which are obtained by encrypting random numbers $r_i$ ($1 \leq i < k$) that satisfy a predetermined relationship with the secret key of owner of the mobile agent by use of ElGamal cryptosystem public keys $y_i$ ($1 \leq i < k$).

4. A signature calculation system by use of a mobile agent as claimed in claim 3, wherein signatures calculated for the random numbers $r_i$ ($1 \leq i < k$) by use of the secret key of the owner of the mobile agent are added to the partial signature auxiliary data carried by the mobile agent.

5. A signature calculation system by use of a mobile agent as claimed in claim 1, wherein the digital signature calculated for the signature target data is an RSA digital signature.

6. A signature calculation system by use of a mobile agent as claimed in claim 5, wherein the partial signature combining means of the remote host that presented the signature target data calculates the digital signature for the signature target data by obtaining the product (mod p×q (p, q: prime number of approximately 512 bits)) of the partial signatures calculated by the k remote hosts.

7. A signature calculation system by use of a mobile agent comprising: a mobile agent for calculating a digital signature of the owner of the mobile agent; a base host of the mobile agent target data being target data to which a digital signature of the owner is to be attached, data which have been carried by the mobile agent including the partial signature auxiliary data and a secret key of the remote host are inputted and which calculates a partial signature which is necessary for the calculation of the digital signature of the owner of the mobile agent;
   a partial signature combining means to which one or more partial signatures calculated by one or more remote hosts are inputted and which outputs the digital signature calculated for the signature target data by use of the newly generated secret key; and
   a public key cryptography calculation means for conducting encryption and signature calculation for the partial signature calculated by the partial signature calculation means, and
   the mobile agent, which started from the base host carrying the partial signature auxiliary data and which is arbitrarily presented with the signature target data by a remote host, stores the signature target data if the mobile agent determined to write the digital signature for the signature target data by use of the newly generated secret key, and thereafter visits k (k: security parameter) remote hosts and carries the partial signatures calculated by the remote hosts to the remote host that presented the signature target data, at which the digital signature for the signature target data by use of the newly generated secret key is obtained from the partial signatures calculated by the k remote hosts.

8. A signature calculation system by use of a mobile agent as claimed in claim 7, wherein one or more components of the remote host selected from the partial signature calculation means, the partial signature combining means and the public key cryptography calculation means are implemented by program code of the mobile agent.

9. A signature calculation system by use of a mobile agent as claimed in claim 7, wherein the partial signature auxiliary data generated by the partial signature auxiliary data generation means include cipher texts ($G_i$, $M_i$) ($1 \leq i < k$) which are obtained by encrypting random numbers $r_i$ ($1 \leq i < k$) that satisfy a predetermined relationship with the newly generated secret key by use of ElGamal cryptosystem public keys $y_i$ ($1 \leq i < k$).

10. A signature calculation system by use of a mobile agent as claimed in claim 9, wherein signatures calculated for the random numbers $r_i$ ($1 \leq i < k$) by use of a secret key of the owner of the mobile agent, a signature calculated for the newly generated public key by use of the secret key of the owner of the mobile agent, and the newly generated public key are added to the partial signature auxiliary data carried by the mobile agent.

11. A signature calculation system by use of a mobile agent as claimed in claim 7, wherein the digital signature calculated for the signature target data is an RSA digital signature.

12. A signature calculation system by use of a mobile agent as claimed in claim 11, wherein the partial signature combining means of the remote host that presented the signature target data calculates the digital signature for the signature target data by obtaining the product (mod p×q (p, q: prime number of approximately 512 bits)) of the partial signatures calculated by the k remote hosts.

13. A computer-readable record medium storing a program for instructing a computer of a base host of a mobile agent to execute:
   an agent execution process for letting the mobile agent execute its program code;
   a random number generation process for generating random numbers;
   a partial signature auxiliary data generation process for receiving the random numbers generated in the random number generation process and a secret key of the owner of the mobile agent as input data and generating partial signature auxiliary data for distributing the information of the secret key of the owner of the mobile agent to remote hosts so that the partial signature auxiliary data will be used when partial signatures necessary for the calculation of a digital signature of the owner of the mobile agent are calculated by remote hosts; and
   a public key cryptography calculation process for conducting encryption and signature calculation for the partial signature auxiliary data generated in the partial signature auxiliary data generation process.

14. A computer-readable record medium storing a program for instructing a computer of a remote host to execute:
   an agent execution process for letting a mobile agent execute its program code;
   a partial signature calculation process for receiving signature target data which has been arbitrarily presented to the mobile agent by a remote host, the signature target data being target data to which a digital signature of the owner of the mobile agent is to be attached, data which have been carried by the mobile agent including partial signature auxiliary data which has been generated based on generated random numbers and a secret key of the owner at a base host, and a secret key of the remote host as input data, and calculating a partial signature which is necessary for the calculation of a digital signature of the owner of the mobile agent for the signature target data;
   a partial signature combining process for receiving one or more partial signatures calculated by one or more remote hosts as input data and outputting the digital signature calculated for the signature target data by use of a secret key of the owner of the mobile agent; and a public key cryptography calculation process for conducting encryption and signature calculation for the partial signature calculated in the partial signature calculation process.

15. A computer-readable record medium as claimed in claim 14, wherein the digital signature calculated for the signature target data in the partial signature combining process is an RSA digital signature.

16. A computer-readable record medium as claimed in claim 15, wherein in the partial signature combining process, the digital signature for the signature target data is calculated by obtaining the product (mod p×q (p, q: prime number of approximately 512 bits)) of the partial signatures calculated by the one or more remote hosts.

17. A computer-readable record medium storing a program for instructing a computer of a base host of a mobile agent to execute:
   an agent execution process for letting the mobile agent execute its program code;
   a random number generation process for generating random numbers;
   a partial signature auxiliary data generation process for receiving the random numbers generated in the random number generation process as input data, generating a new secret key and a new public key corresponding to the newly generated secret key, generating partial signature auxiliary data for distributing the information of the newly generated secret key to remote hosts so that the partial signature auxiliary data will be used when partial signatures necessary for the calculation of a digital signature of the owner of the mobile agent are calculated by remote hosts, and generating a digital signature for the partial signature auxiliary data using a secret key of the owner of a mobile agent; and
   a public key cryptography calculation process for conducting encryption and signature calculation for the partial signature auxiliary data generated in the partial signature auxiliary data generation process.

18. A computer-readable record medium storing a program for instructing a computer of a remote host to execute:
   an agent execution process for letting a mobile agent execute its program code;
   a partial signature calculation process for receiving signature target data which has been arbitrarily presented to the mobile agent by a remote host, the signature target data being target data to which a digital signature of the owner of the mobile agent is to be attached, data which have been carried by the mobile agent including partial signature auxiliary data which has been generated based on generated random numbers and a secret key of the owner at a base host, and a secret key of the remote host as input data, and calculating a partial signature which is necessary for the calculation of a digital signature of the owner of the mobile agent for the signature target data;
   a partial signature combining process for receiving one or more partial signatures calculated by one or more remote hosts as input data and outputting the digital signature calculated for the signature target data by use of the newly generated secret key; and
   a public key cryptography calculation process for conducting encryption and signature calculation for the partial signature calculated in the partial signature calculation process.

19. A computer-readable record medium as claimed in claim 18, wherein the digital signature calculated for the signature target data in the partial signature combining process is an RSA digital signature.

20. A computer-readable record medium as claimed in claim 19, wherein in the partial signature combining process, the digital signature for the signature target data is calculated by obtaining the product (mod p×q (p, q: prime number of approximately 512 bits)) of the partial signatures calculated by the one or more remote hosts.

* * * * *